United States Patent
Maruyama et al.

(10) Patent No.: US 9,544,462 B2
(45) Date of Patent: Jan. 10, 2017

(54) IMAGE CAPTURING APPARATUS AND CONTROL METHOD OF IMAGE CAPTURING APPARATUS

(71) Applicant: Olympus Corporation, Hachioji-shi, Tokyo (JP)

(72) Inventors: Atsushi Maruyama, Sagamihara (JP); Tomomi Nakajima, Musashino (JP); Kensei Ito, Sagamihara (JP); Naoki Fujii, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/705,266

(22) Filed: May 6, 2015

(65) Prior Publication Data

US 2015/0358497 A1   Dec. 10, 2015

(30) Foreign Application Priority Data

Jun. 9, 2014 (JP) ................. 2014-118893

(51) Int. Cl.
*H04N 5/222* (2006.01)
*H04N 1/21* (2006.01)
*H04N 5/232* (2006.01)

(52) U.S. Cl.
CPC ........ *H04N 1/2112* (2013.01); *H04N 5/23293* (2013.01); *H04N 5/23216* (2013.01)

(58) Field of Classification Search
CPC ............ H04N 5/23216; H04N 5/23293; H04N 1/2112
See application file for complete search history.

(56) References Cited

U.S. PATENT DOCUMENTS

| | | | | |
|---|---|---|---|---|
| 2004/0042791 A1* | 3/2004 | Suekane | ............ | H04N 5/23293 396/661 |
| 2006/0139462 A1* | 6/2006 | Fukasawa | .......... | H04N 1/32128 348/231.3 |
| 2009/0040347 A1* | 2/2009 | Uehara | .............. | H04N 1/00413 348/294 |
| 2010/0296806 A1* | 11/2010 | Seo | ........................ | G03B 7/003 396/236 |

(Continued)

FOREIGN PATENT DOCUMENTS

JP   2012-146071   8/2012

*Primary Examiner* — Aung S Moe
*Assistant Examiner* — John H Morehead, III
(74) *Attorney, Agent, or Firm* — John C. Pokotylo; Straub & Pokotylo

(57) ABSTRACT

An image capturing apparatus includes an image capturing unit, an image processing unit, a database, a display unit, a coordinate acquisition unit, a shooting parameter decision unit and a control unit. The image capturing unit acquires image data. The image processing unit performs image processing. The database includes a relationship between a sensitivity word pair and a change in a control parameter. The display unit displays an operation position together with the sensitivity word pair. The coordinate acquisition unit decides a value corresponding to the sensitivity word pair as a selected value. The shooting parameter decision unit decides a value of a shooting parameter based on the selected value. The control unit controls the image capturing unit or the image processing unit based on the value of the shooting parameter.

9 Claims, 15 Drawing Sheets

(56) References Cited

U.S. PATENT DOCUMENTS

| | | | |
|---|---|---|---|
| 2011/0187815 A1* | 8/2011 | Asami | H04N 5/228 348/36 |
| 2013/0076936 A1* | 3/2013 | Yoshida | H04N 5/23293 348/222.1 |
| 2013/0083211 A1* | 4/2013 | Kunishige | H04N 5/2621 348/220.1 |
| 2014/0078325 A1* | 3/2014 | Sakaida | H04N 5/232 348/208.4 |
| 2015/0006183 A1* | 1/2015 | Daishaku | G10L 15/22 704/275 |

* cited by examiner

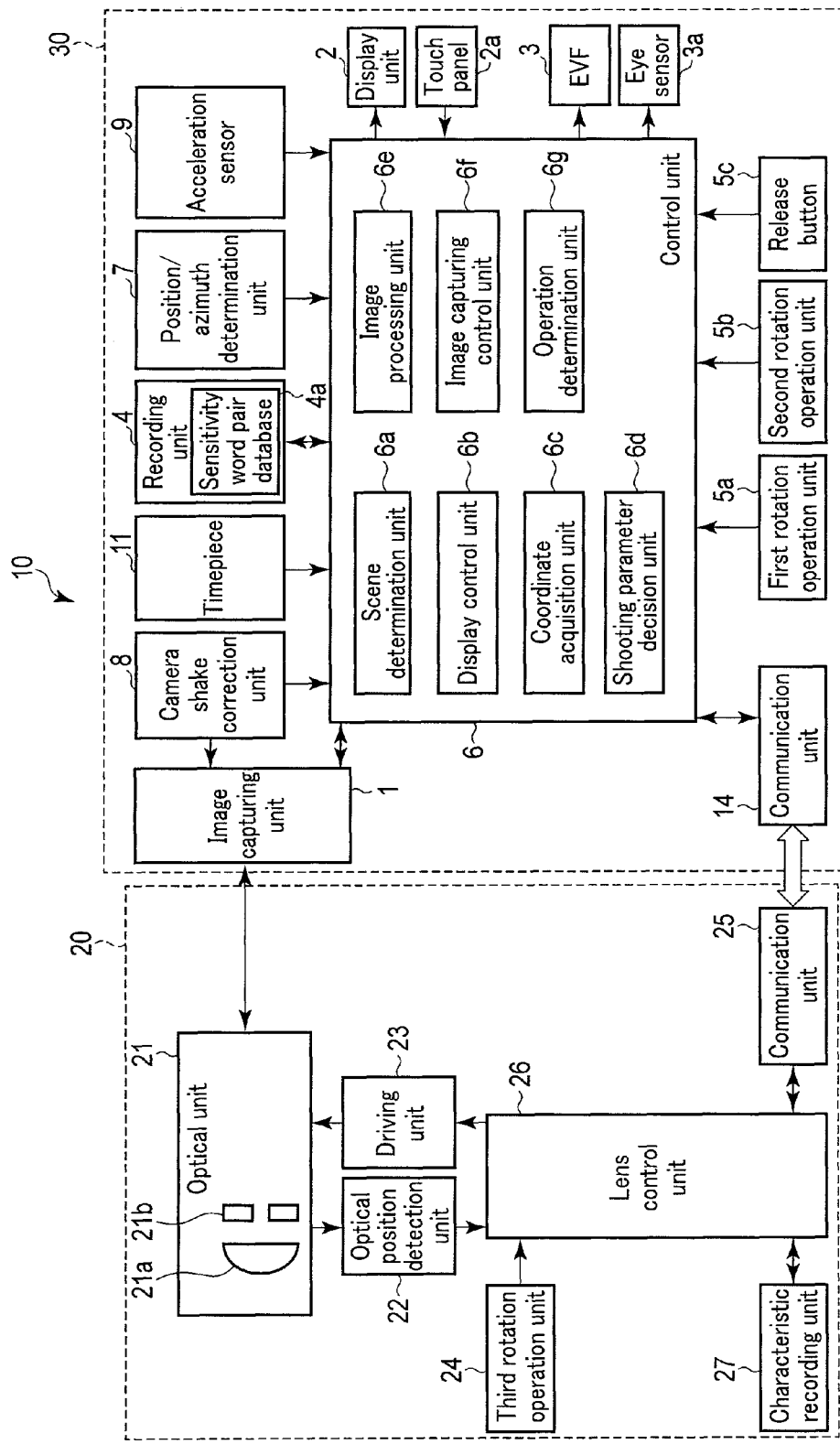
F I G. 1

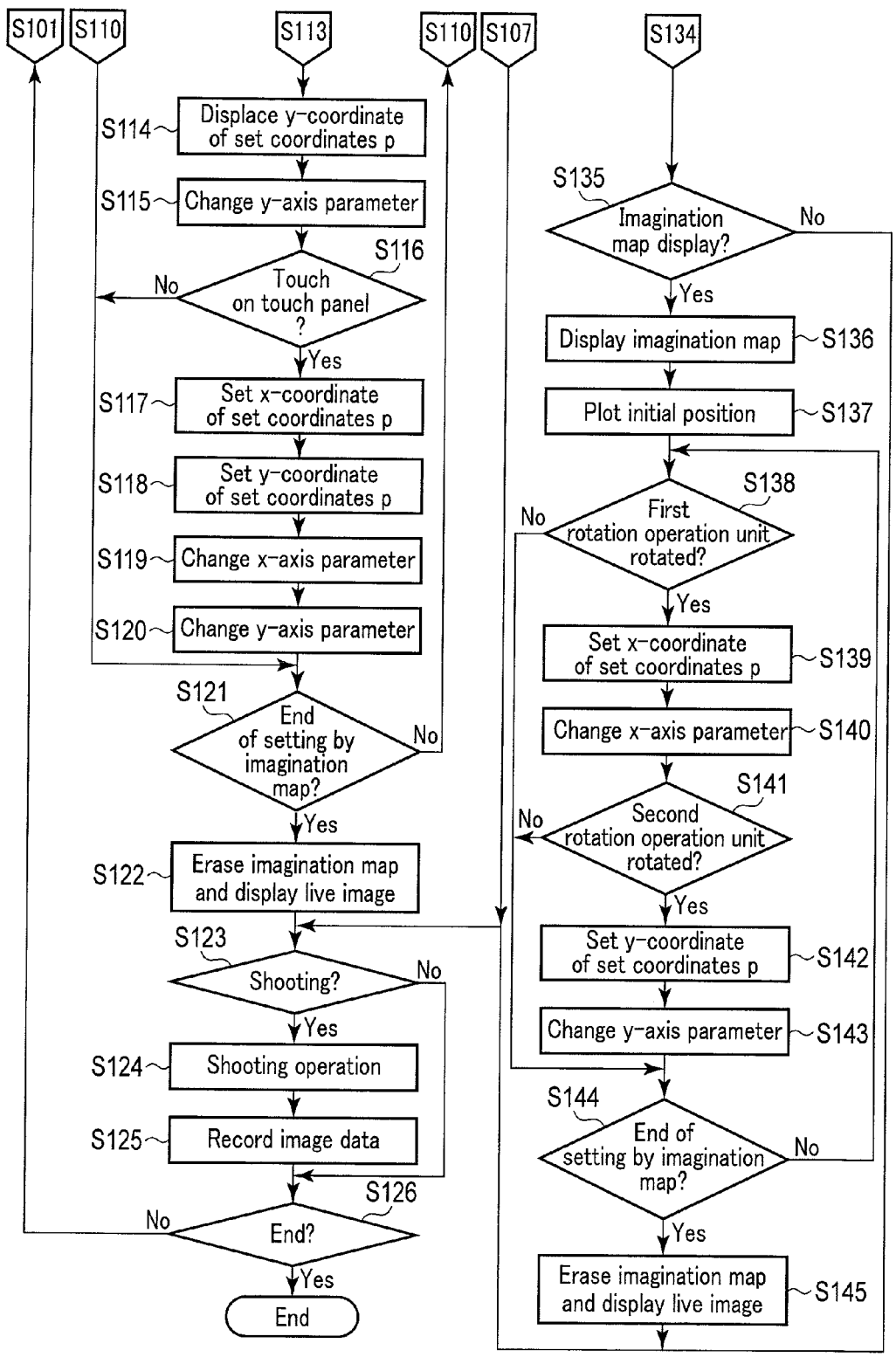
F I G. 4B

Degree of color enhancement (solid line)
Exposure correction value
  Unsaturated portion (broken line)
  Saturated portion (one-dot dashed line)

F-number (solid line)
Contrast (broken line)

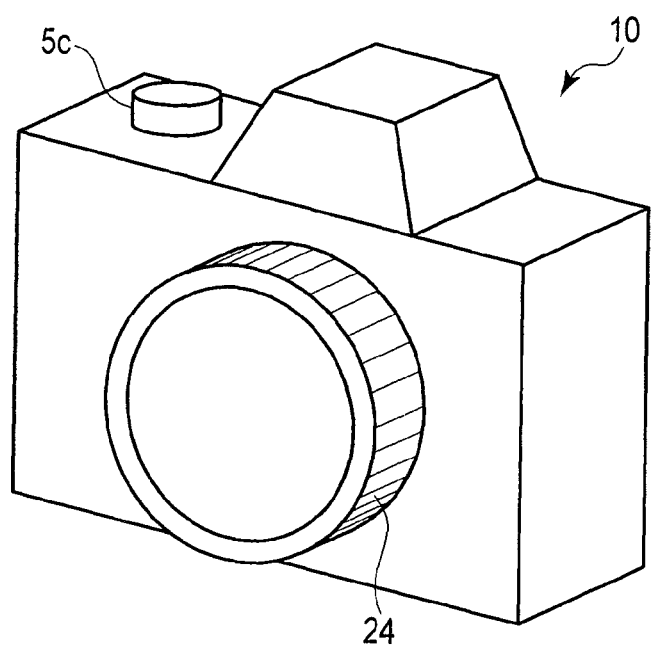
F I G. 10
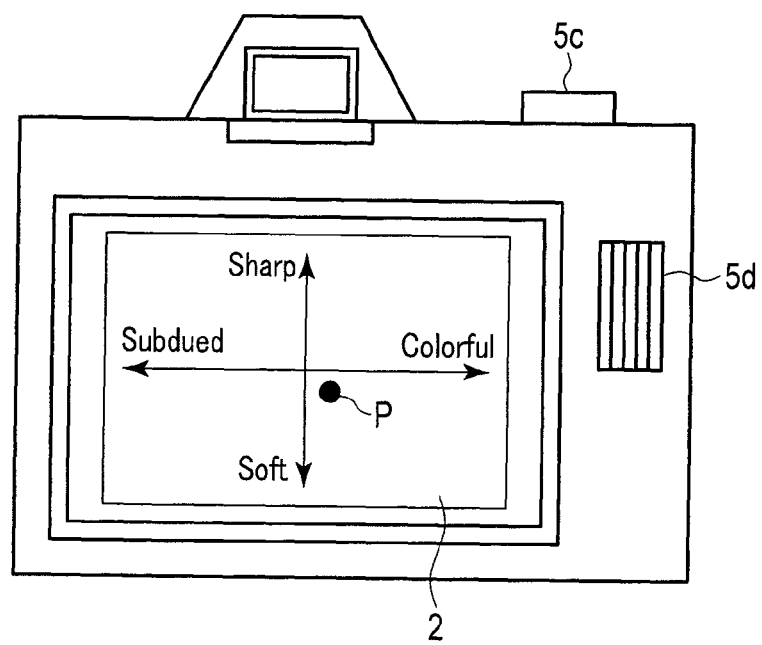
F I G. 11

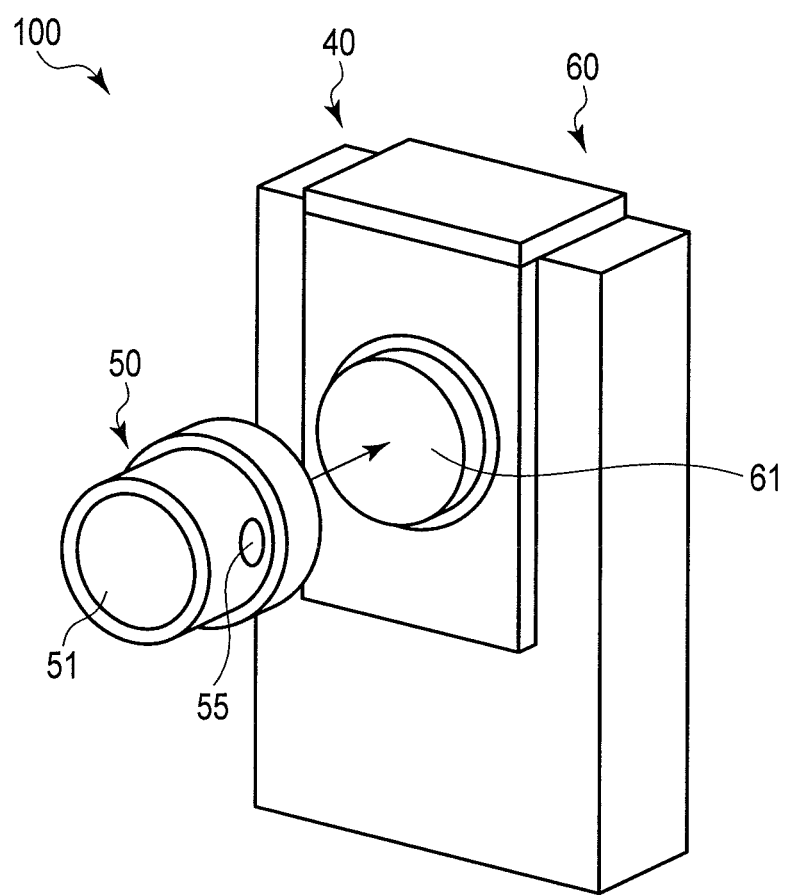
F I G. 12

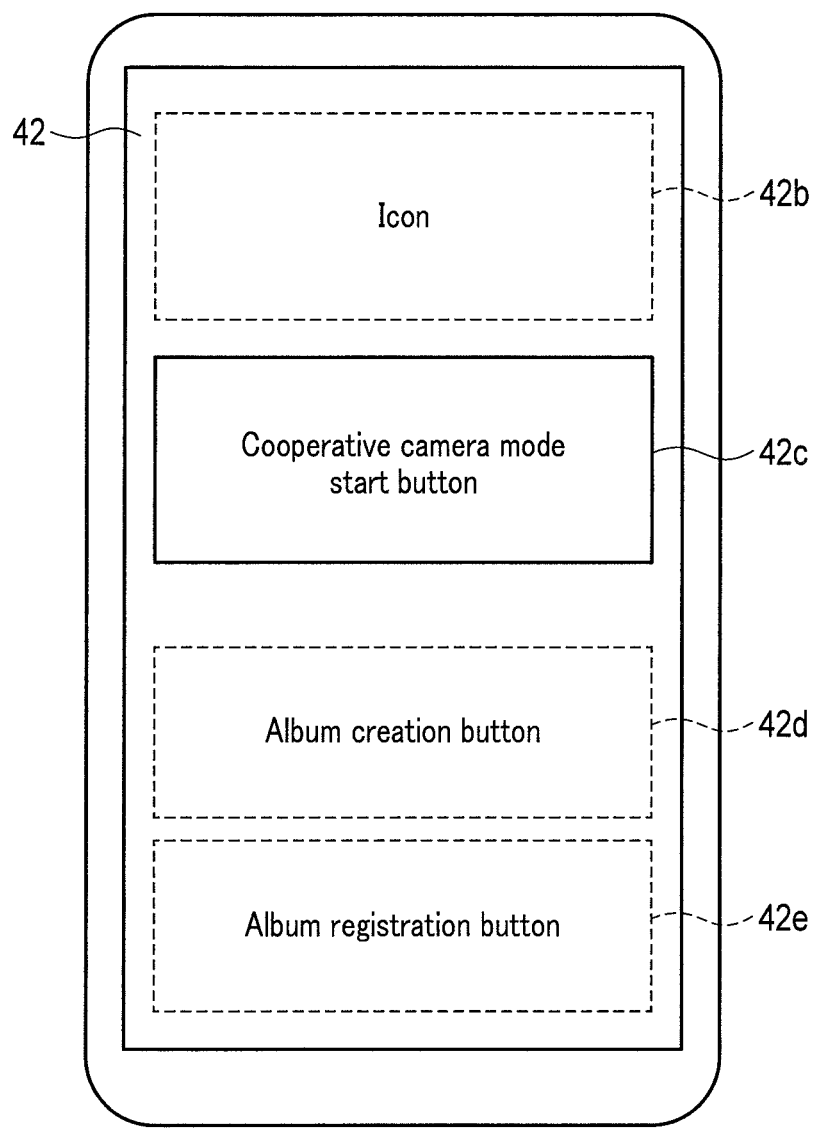
F I G. 15

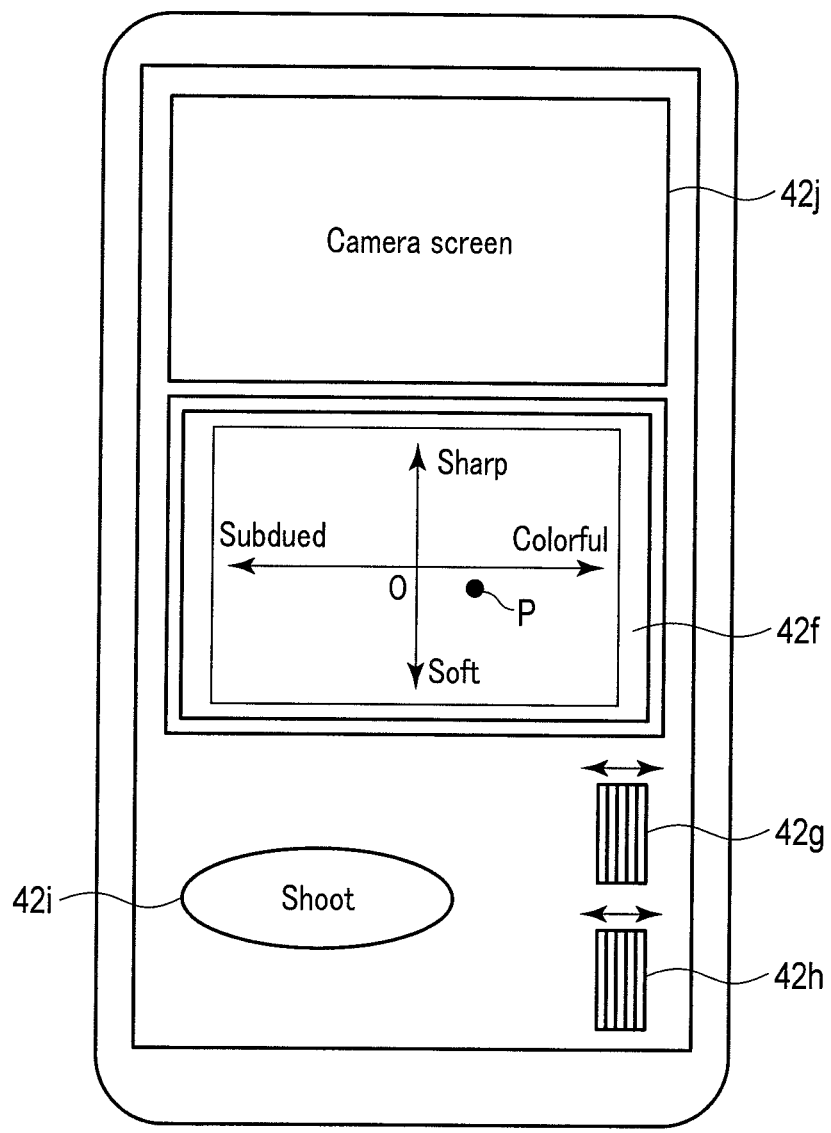
F I G. 16

IMAGE CAPTURING APPARATUS AND CONTROL METHOD OF IMAGE CAPTURING APPARATUS

CROSS-REFERENCE TO RELATED APPLICATIONS

This application is based upon and claims the benefit of priority from the prior Japanese Patent Application No. 2014-118893, filed Jun. 9, 2014, the entire contents of which are incorporated herein by reference.

BACKGROUND OF THE INVENTION

1. Field of the Invention

The present invention relates to an image capturing apparatus and a control method of the image capturing apparatus.

2. Description of the Related Art

When performing image capturing using a digital camera, the user may want to express his or her imagination using images. An image obtained by the digital camera can change depending on the settings of various shooting parameters, for example, optical parameters such as exposure, shutter speed and f-number, and parameters of image processing such as contrast and color correction. It may be difficult for a general photographer to obtain an image imagined by himself/herself by adjusting various shooting parameters.

For example, Jpn. Pat. Appln. KOKAI Publication No. 2012-146071 discloses a technique of an image processing apparatus capable of obtaining an image quality more similar to an intended image quality by an intuitive operation without the necessity of expert knowledge of image processing. In the image processing apparatus of Jpn. Pat. Appln. KOKAI Publication No. 2012-146071, parameters of image processing are changed by operating a slide bar. Also disclosed is associating a sensitivity word related to a parameter of image processing with the slide bar. The sensitivity word includes an adjective representing a feature of an image. With the image after image processing in mind based on the sensitivity word, the user operates the slide bar, thereby intuitively deciding on the expression of the image. On the other hand, although the sensitivity word is associated with the slide bar disclosed in Jpn. Pat. Appln. KOKAI Publication No. 2012-146071, it is not sufficiently easy to imagine how the characteristics of the image should be changed by a slide operation using the slide bar or perform an operation using the slide bar to attain an ambiguous expression, for example, rather something like this. It is necessary to more intuitively and more easily obtain an image of a desired expression by image capturing.

BRIEF SUMMARY OF THE INVENTION

According to one aspect of the invention, an image capturing apparatus includes an image capturing unit configured to capture an object and acquire image data; an image processing unit configured to perform image processing for the image data; a database including a relationship between a sensitivity word pair that is a pair of sensitivity words and a change in a control parameter; a display unit configured to display an operation position together with the sensitivity word pair; a coordinate acquisition unit configured to acquire coordinates on the display unit and decide a value corresponding to the sensitivity word pair as a selected value; a shooting parameter decision unit configured to decide a value of at least one shooting parameter from the database based on the selected value; and a control unit configured to control an operation of at least one of the image capturing unit and the image processing unit based on the value of the shooting parameter.

According to another aspect of the invention, a control method of an image capturing apparatus includes capturing an object and acquiring image data; performing image processing for the image data; causing a display unit to display an operation position together with a sensitivity word pair that is a pair of sensitivity words; acquiring coordinates displayed on the display unit and deciding a value corresponding to the sensitivity word pair as selected value; deciding, based on the selected value, a value of at least one shooting parameter from a database configured to cause the pair of sensitivity words to match a direction of a change in a control parameter; and controlling, based on the value of the shooting parameter, at least one of the capturing the object and acquiring the image data and the performing image processing.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of a configuration of an image capturing apparatus according to the first embodiment;

FIG. 4B is a second flowchart showing an operation example of the image capturing apparatus according to the first embodiment;

FIG. 10 is a perspective view showing the front appearance of an image capturing apparatus according to a modification of the first embodiment;

FIG. 11 is a plan view showing the rear appearance of the image capturing apparatus according to the modification of the first embodiment;

FIG. 12 is a perspective view showing the outline of an image capturing system according to a second embodiment;

FIG. 15 is a view showing a display example of an initial screen on the portable terminal according to the second embodiment;

FIG. 16 is a view showing a display example of an imagination map on the portable terminal according to the second embodiment.

DETAILED DESCRIPTION OF THE INVENTION

First Embodiment

Figure 2:
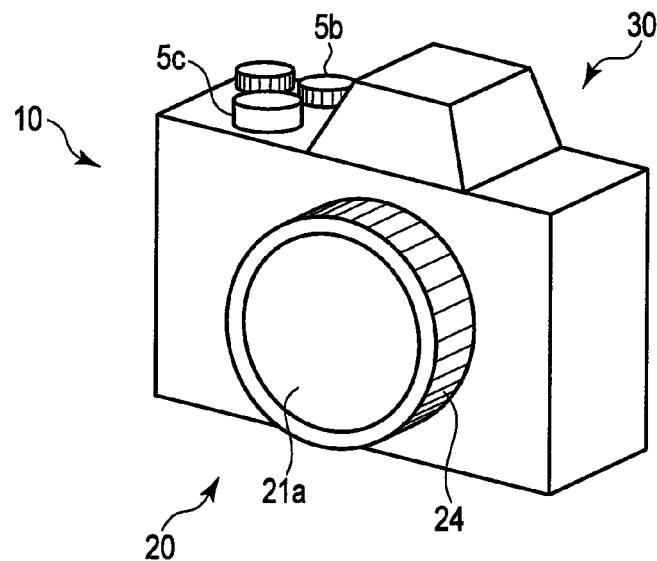
FIG. 2 is a perspective view showing the front appearance of the image capturing apparatus according to the first embodiment.
Figure 3:
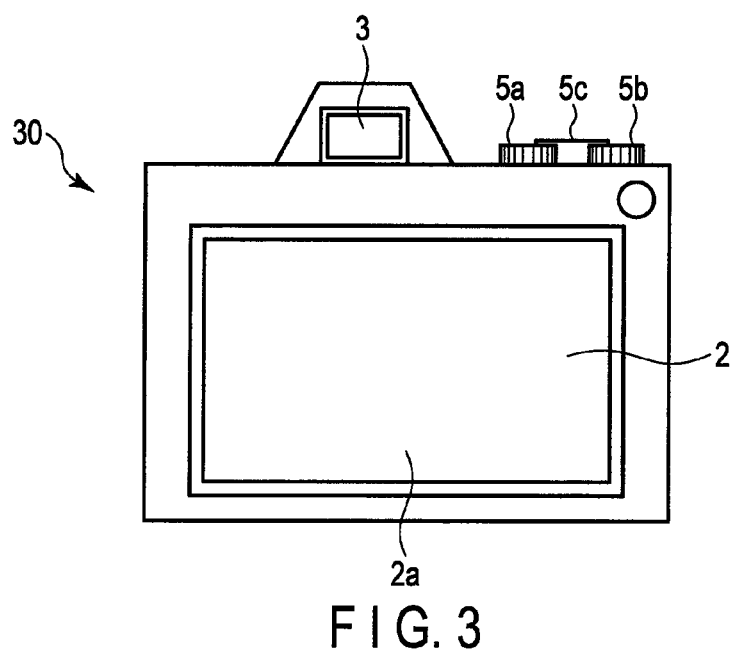
FIG. 3 is a plan view showing the rear appearance of the image capturing apparatus according to the first embodiment.

An image capturing apparatus according to the first embodiment of the present invention will now be described with reference to FIGS. 1, 2, 3, 4A, 4B, 5, 6, 7, 8, and 9. FIG. 1 shows an example of the configuration of an image capturing apparatus 10 according to the first embodiment. FIG. 2 shows the front appearance of the image capturing apparatus 10. FIG. 3 shows the rear appearance of the image capturing apparatus 10.

The image capturing apparatus 10 includes a lens unit 20 and a main body 30. The lens unit 20 is attached to the main body 30.

The lens unit 20 includes an optical unit 21, an optical position detection unit 22, a driving unit 23, a third rotation operation unit 24, a communication unit 25, a lens control unit 26, and a characteristic recording unit 27.

The optical unit 21 includes a lens 21a and a stop 21b. The lens 21a can include one or a plurality of lenses 21a. The lens 21a forms an image of an object (not shown) on an image sensor in an image capturing unit 1 to be described later. The stop 21b adjusts the amount of a light beam concerning the object image.

The optical position detection unit 22 detects the position information of each component in the optical unit 21, for example, the position information of the lens 21a in the optical axis direction, and outputs the position information to the lens control unit 26.

The driving unit 23 moves the lens 21a in accordance with an instruction from the lens control unit 26. As the lens 21a moves, the focal length or in-focus state changes. The driving unit 23 may drive the stop 21b and change its aperture diameter.

The third rotation operation unit 24 is provided around the lens unit 20, as shown in FIG. 2. For example, when rotated by the user, the third rotation operation unit 24 outputs a signal according to the rotational direction and the rotation amount to the lens control unit 26.

The communication unit 25 mediates communication between the lens control unit 26 and a control unit 6 in the main body 30.

The characteristic recording unit 27 records information about a characteristic, for example, a focal length or stop of a lens group (not shown) provided in the optical unit 21. This information is used to, for example, control driving of the lens.

The lens control unit 26 controls the operation of each unit of the lens unit 20 based on an instruction from the control unit 6 of the main body 30. For example, the lens control unit 26 outputs a driving signal to drive the lens 21a to the driving unit 23 for zooming or focusing. The lens control unit 26 also transmits, to the control unit 6, information about the optical unit 21 acquired from the optical position detection unit 22. When the third rotation operation unit 24 is rotated, the lens control unit 26 transmits the information of the rotational direction and the rotation amount to the control unit 6.

The main body 30 includes the image capturing unit 1, a display unit 2, a touch panel 2a, an electronic view finder (EVF) 3, an eye sensor 3a, a recording unit 4, a first rotation operation unit 5a, a second rotation operation unit 5b, a release button 5c, the control unit 6, a position/azimuth determination unit 7, a camera shake correction unit 8, an acceleration sensor 9, a timepiece 11, and a communication unit 14.

The image capturing unit 1 includes an image sensor. The image capturing unit 1 generates an electrical signal (image data) based on an object image formed on the imaging plane of the image sensor.

The display unit 2 includes, for example, a liquid crystal display. The display unit 2 is provided on the rear surface of the main body 30, as shown in FIG. 3. The display unit 2 displays an image based on image data output from the control unit 6.

As shown in FIG. 3, the touch panel 2a is provided to be overlaid on the display unit 2. The touch panel 2a detects a touched position and outputs the detected position information to the control unit 6.

As shown in FIG. 3, the EVF 3 is provided in the upper portion of the main body 30. The EVF 3 includes a precise display device provided in an observation window. The EVF 3 displays an image based on image data output from the control unit 6.

The eye sensor 3a detects a line of sight facing the EVF 3. That is, the eye sensor 3a detects whether the photographer is looking in the EVF 3. For example, display in the EVF 3 is turned on/off depending on whether the eye sensor 3a has detected a line of sight.

The recording unit 4 records image data. The recording unit 4 includes a sensitivity word pair database (DB) 4a. The sensitivity word pair DB 4a records sensitivity word pair data representing the corresponding relationship between sensitivity word pairs (to be described later) and shooting scenes and shooting parameters, as will be described later.

The first rotation operation unit 5a and the second rotation operation unit 5b are provided on the top of the main body 30, as shown in FIG. 3. Each of the first rotation operation unit 5a and the second rotation operation unit 5b detects the rotational direction and the rotation amount and outputs a signal according to the detection result to the control unit 6, like the third rotation operation unit 24.

The position/azimuth determination unit 7 includes, for example, a GPS and an azimuth sensor, and detects the position of the image capturing apparatus 10 and the azimuth in which the image capturing apparatus 10 faces. The detected position information or azimuth information is used, for example, by a scene determination unit 6a (to be described later) to determine a scene.

To reduce the influence of a camera shake, for example, the camera shake correction unit 8 displaces the image sensor in the image capturing unit 1 in accordance with the camera shake. An image with little blur can be shot by the camera shake correction.

The acceleration sensor 9 detects an acceleration applied to the image capturing apparatus 10. The information of the detected acceleration is used to, for example, correct a camera shake.

The timepiece 11 outputs time information to acquire a time to be added to image data.

The control unit 6 includes the scene determination unit 6a, a display control unit 6b, a coordinate acquisition unit 6c, a shooting parameter decision unit 6d, an image processing unit 6e, an image capturing control unit 6f, and an operation determination unit 6g.

The scene determination unit 6a determines a shooting scene. The shooting scene is determined based on, for example, image data acquired by image capturing. The scene determination unit 6a also selects two sensitivity word pairs corresponding to the shooting scene from the sensitivity word pair DB 4a.

The display control unit 6b creates an image based on image data and causes the display unit 2 or EVF 3 to display the image. The display control unit 6b also causes the display unit 2 or EVF 3 to display an imagination map. The imagination map is an indicator that associates two sensitivity word pairs with an orthogonal coordinate system.

The coordinate acquisition unit 6c acquires coordinates selected on the coordinate system of the imagination map, and decides, as selected values, the values of at least two variables associated with the acquired coordinates.

The shooting parameter decision unit 6d decides the value of at least one shooting parameter based on the selected values decided by the coordinate acquisition unit 6c.

The image processing unit 6e performs various kinds of image processing. The image processing includes image processing according to shooting parameters. The image processing unit 6e performs, for example, image processing of adjusting brightness, chroma, degree of blur, noise, shading, and the like for image data.

The image capturing control unit 6f performs various kinds of control concerning image capturing. The control includes, for example, control according to decided shooting parameters such as a stop diameter and a shutter speed. The image capturing control unit 6f controls, for example, the operation of the optical unit 21 in accordance with the shooting parameters via the lens control unit 26. The image capturing control unit 6f also controls the operation of the image capturing unit 1 in accordance with the shooting parameters.

The operation determination unit 6g acquires a signal detected by the touch panel 2a, the first rotation operation unit 5a, the second rotation operation unit 5b, the release button 5c, or the third rotation operation unit 24 of the lens unit 20. The operation determination unit 6g performs necessary signal processing for the acquired signal and outputs it to each unit.

Figure 4A:
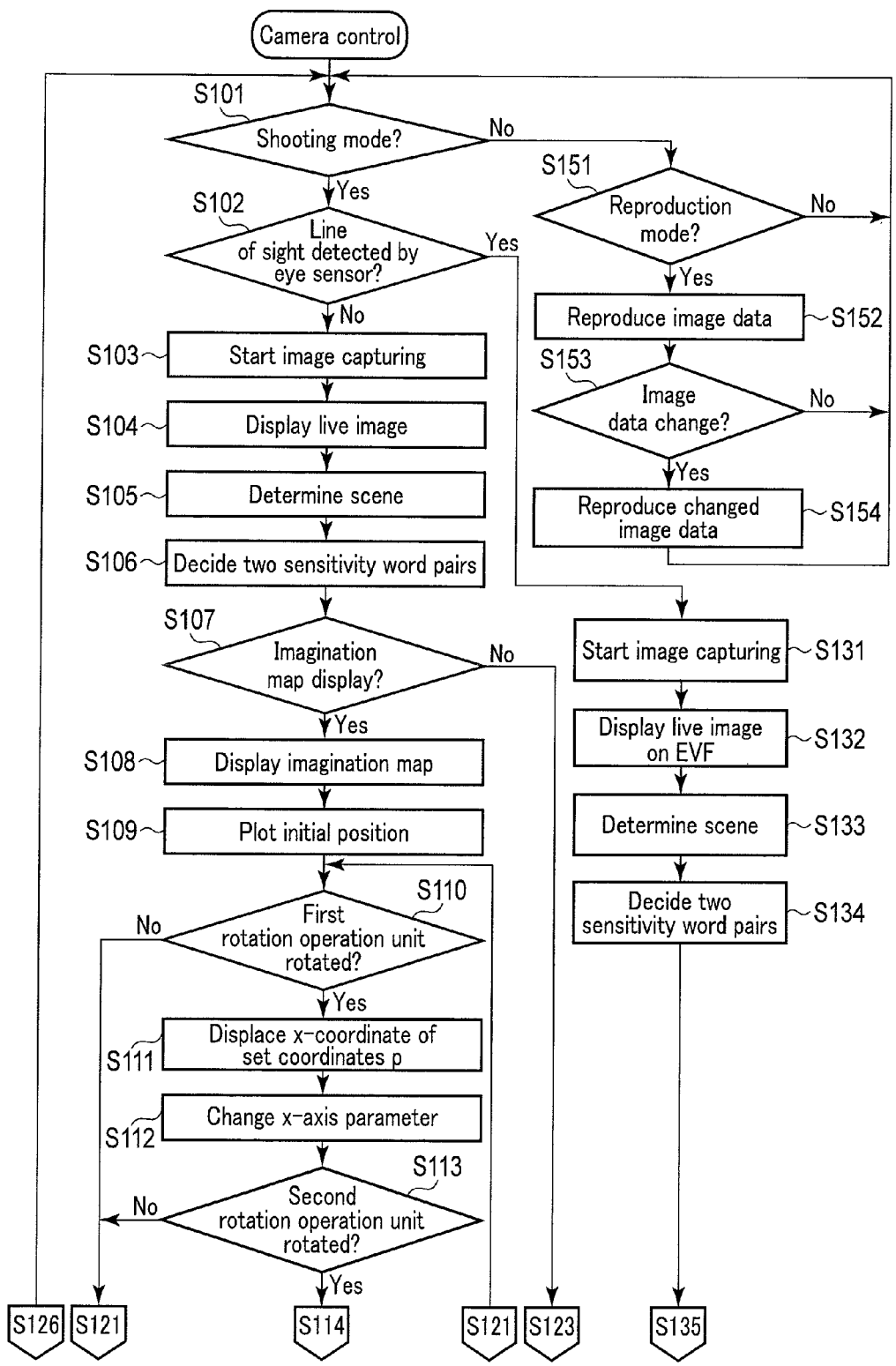
FIG. 4A is a first flowchart showing an operation example of the image capturing apparatus according to the first embodiment.

An operation example of the image capturing apparatus according to the first embodiment of the present invention will be described with reference to the flowcharts of camera control shown in FIGS. 4A and 4B. The camera control starts when, for example, the image capturing apparatus 10 is powered on.

In step S101, the control unit 6 determines whether the shooting mode is selected. Upon determining that the shooting mode is selected, the process advances to step S102.

In step S102, the control unit 6 determines whether the eye sensor 3a is detecting the line of sight of the photographer. Upon determining that the eye sensor 3a is not detecting the line of sight of the photographer, the process advances to step S103.

In step S103, the control unit 6 causes the units of the image capturing apparatus 10 to start an image capturing operation. That is, in the image capturing apparatus 10, an object image is formed, via the optical unit 21, on the imaging plane of the image sensor provided in the image capturing unit 1. The image capturing unit 1 generates image data based on the object image. The process then advances to step S104.

In step S104, the control unit 6 creates a live image based on the image data acquired by image capturing and causes the display unit 2 to display the live image. After that, the process advances to step S105.

In step S105, the scene determination unit 6a of the control unit 6 determines the shooting scene based on the image acquired by image capturing. The shooting scene is, for example, a subset scene including a person with his/her back against the evening sun, a night scene in which the object is a night view, a portrait scene in which the object is a person, or a sport scene in which people are playing a sport. The process then advances to step S106.

In step S106, the scene determination unit 6a of the control unit 6 decides two sensitivity word pairs according to the shooting scene decided in step S105. The sensitivity word pair represents a pair of sensitivity words opposite to each other in terms of meaning. The sensitivity word (impression word) is a word that arouses a shooting imagination of the user. The sensitivity word is a word considered to be generally used by the user as a photographic expression.

The general sensitivity word (impression word) is an expression having subjectivity or ambiguity. The sensitivity word also has a multiplicity of sensitivity expressions and context dependence that reflects a user's life experience, memory, and feelings related to it. The term "sensitivity" does not define a single concept. The term "sensitivity" has the above-described context dependence. The term "sensitivity" is able to be recognized as a concept "expressing perception of a target by subjective experiences".

However, there are obviously relative differences between different sensitivity words. One sensitivity word for one user may arouse a different sensation for another user. Many users statistically share the same set of sensitivities, as such are based on common culture, environment, and society.

For example, the classification of emotions having influence on sensitivities can, for example, be expressed by R. Plutchik's three-dimensional model of emotions "joy" and "sadness", "disgust" and "acceptance", and the like as pairs.

When recording a pleasant memory in, for example, a photo taking scene, a sensitivity word that includes a meaning that psychologically arouses a negative emotion is generally not needed. When recording a pleasant memory, it is preferable to use an expression that is the counterpart of the sensitivity word that psychologically arouses a negative emotion, that is, an expression that psychologically arouses a sensation similar to the sensation aroused by sensitivity word that arouses a negative emotion but a different sensation is preferable.

For example, "gorgeous" and "plain" are known as a sensitivity word pair having an antonymous relationship and are often used by a designer or the like. The word "gorgeous" is sometimes perceived as an imagination "excessive", and the word "plain" is sometimes perceived as a word lacking in imagination, or being too weak to arouse a sensitivity or sensation. Hence, the sensitivity word pair "gorgeous" and "plain" is preferably replaced with a sensitivity word pair "colorful" and "subdued".

The sensitivity word pair "colorful" and "subdued" also has an imagination capable of psychologically including a sensitivity word pair "lively" and "lonely" or a sensitivity word pair "romantic" and "classic". These sensitivity word pairs express more sensitive features.

As words expressing the feature of an image more clearly, a sensitivity word pair "sharp" and "soft" may be used. This sensitivity word pair covers the imagination of a sensitivity word pair "futuristic" and "nostalgic" or the imagination of a sensitivity word pair "real" and "fantastic".

In this embodiment, a description will be made assuming that, for example, the sensitivity word pairs are pairs of sensitivity words "colorful" and "subdued", "gorgeous" and "plain", "lively" and "lonely", "romantic" and "classic", "sharp" and "soft", "futuristic" and "nostalgic", "real" and "fantastic", "quiet" and "lively", and the like. Note that the above-mentioned sensitivity word pairs are merely examples, and there are various sensitivity word pairs.

Sensitivity word pair data including the above-described sensitivity word pairs includes parameters (shooting parameters) concerning shooting which are associated with the sensitivity word pairs. The shooting parameters include the parameters of the optical system and the parameters of image processing; for example, a stop diameter, shutter speed, contrast, exposure value, chroma, brightness, sharpness, degree of blur, noise, and shading. When a shooting parameter changes, the image expression changes. That is, the sensitivity words are sometimes regarded as very literary. However, in actual shooting or image processing, the sensitivity words often match the effect of changes in specific parameters. The sensitivity words are literary and can also be used as technical terms to arouse such an effect of changes in the parameters.

The meaning of "pairing" sensitivity words especially appears when a change in a parameter enhances the feeling of one sensitivity word and weakens the feeling of the other sensitivity word. This is because the vague impression of each sensitivity word is limited by the relationship with the counterpart word.

For example, both "classic" and "romantic" can roughly be summarized in a concept "artistic". When these sensitivity words are handled as a "pair", a concept "feeling artistic but not romantic, instead clear" or "feeling artistic and vague rather than classic" comes to the surface. For example, when the sensitivity words "clear" and "vague" are put in contrast, the difference between the concepts can obviously be recognized, and clear concepts appear. That is, there is a point in "pairing" the sensitivity words. When the sensitivity words are "paired", the effect of weakening the abstract portion "artistic" which is common to "classic" and "romantic" and clarifying the element of the feature of an image itself can be obtained. Additional concepts in contrast, for example, concepts "formal" and "free" or concepts "trained" and "uncontrolled" may be produced from the contrast of "classic" and "romantic", as a matter of course. However, when the sensitivity words represent the effects of an image, these concepts are difficult to connect to an image. In the camera or image processing apparatus of this embodiment, these concepts never come to the surface.

That is, the effects of pairs that the user can naturally feel are limited by these concepts of the apparatus. If the effects are limited, constraints are given such that the effects and specific parameter changes are associated without any sense of discomfort. Assume that there is a device control apparatus including a database that causes two sensitivity words as words arousing an imagination of the control to match the direction of a change in a control parameter, and a display unit that displays an operation position together with the pair of sensitivity words. When the user selects coordinates on the display unit, the device control apparatus can decide a value corresponding to the pair of sensitivity words to acquire the coordinate information as a selected value. The value of one control parameter can be decided from the database based on the selected value. The device control apparatus includes a control parameter decision unit configured to decide the control parameter, and controls a device in accordance with the control parameter.

Figure 5:
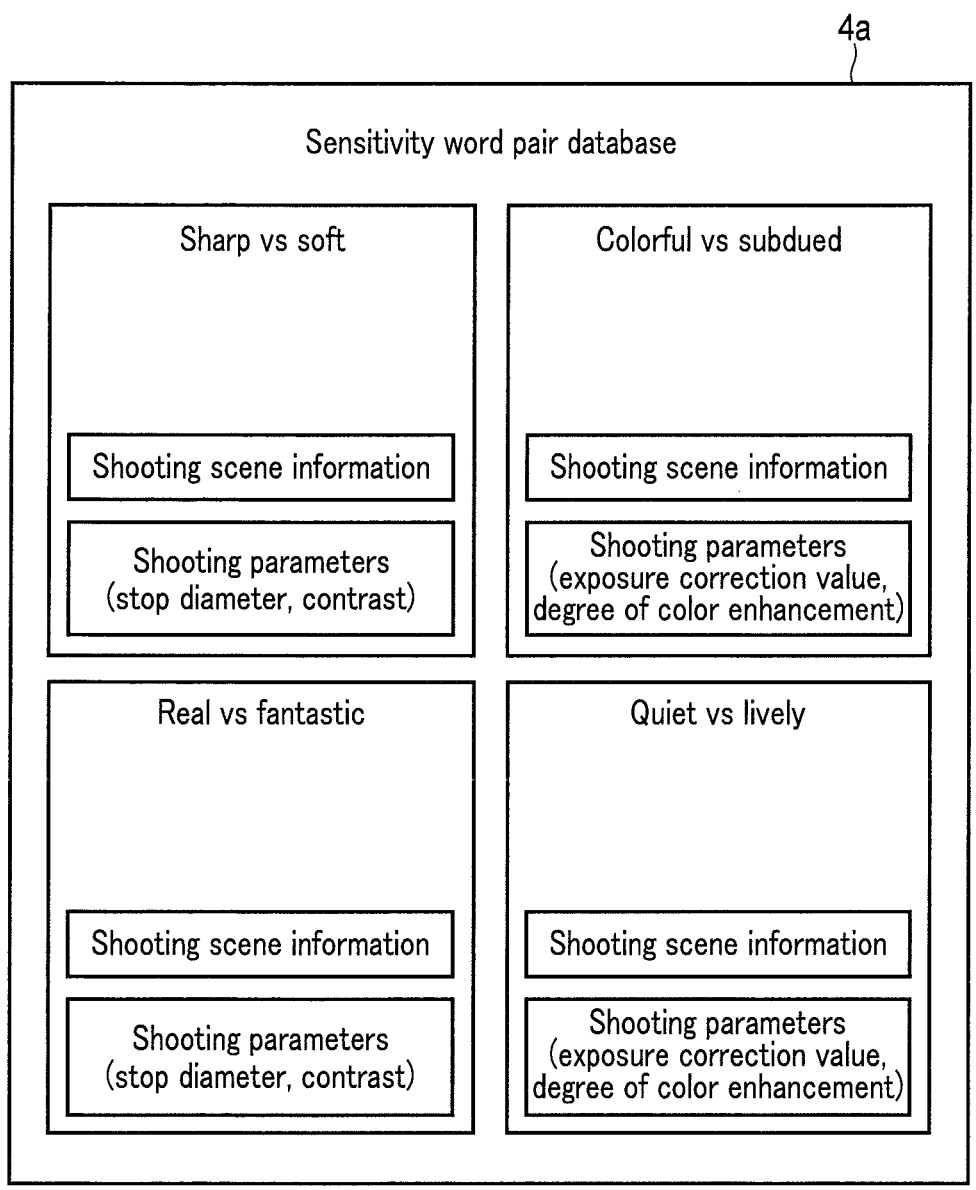
FIG. 5 is a view showing an example of combinations of sensitivity word pairs and shooting parameters.

As shown in FIG. 5, the sensitivity word pair DB 4a stores a plurality of sensitivity word pair data. Each sensitivity word pair data includes a sensitivity word pair, information of a shooting scene associated with the sensitivity word pair, and information about shooting parameters associated with the sensitivity word pair. For example, information about the stop of the imaging optical system and information about contrast in image processing, which are shooting parameters, are associated with the sensitivity word pair "sharp" and "soft". In addition, information about exposure correction and information about color enhancement in image processing, which are shooting parameters, are associated with the sensitivity word pair "colorful" and "subdued". Note that the combinations of sensitivity word pairs and shooting parameters shown in FIG. 5 are merely examples. If a sensitivity word pair and a shooting or image processing parameter are associated in the sensitivity word pair DB 4a, a clearer concept and a technical effect corresponding to the contrast in the pair of sensitivity words are connected in a form not to impede the imagination of the user.

Note that in, for example, setting the temperature of an air conditioner or the like, direct words "warm" and "cool" are used, and explicit parameters such as a temperature and humidity are controlled. In this embodiment, however, since the words are used for abstract photographic expressions, abstract sensitivity word pairs are used.

Sensitivity word pair data is selected based on the shooting scene decided by the above-described scene determination. Subsequent processing is performed based on shooting parameter information included in the sensitivity word pair data. In this embodiment, a description will be made below assuming that the sensitivity word pair "colorful" and "subdued" and the sensitivity word pair "sharp" and "soft" are selected.

The sensitivity word pair "colorful" and "subdued" arouses brightness or chroma regarding image expression. On the other hand, the sensitivity word pair "sharp" and "soft" arouses an outline or contrast that is a feature not aroused by the sensitivity word pair "colorful" and "subdued". In this way, complementary sensitivity word pairs are preferably selected. Appropriately selecting such sensitivity word pairs is decisive to merchandize or a service acceptable by the user without any sense of discomfort. Hence, associating the sensitivity word pairs with functions is a very important user interface technology. The details of the technology will be explained below using limited sensitivity word pairs. However, other sensitivity words are also incorporated within the scope of the present invention as long as they are paired to weaken the abstract concept common to the words and clarify opposite concepts that contrast, as a matter of course.

Referring back to FIG. 4A, in step S107, the control unit 6 determines whether it is requested to cause the display unit 2 to display an imagination map that associates the sensitivity word pairs with two-dimensional coordinates. For example, when a mode to adjust the shooting parameters using an imagination map is selected, displaying the imagination map is requested.

Figure 6:
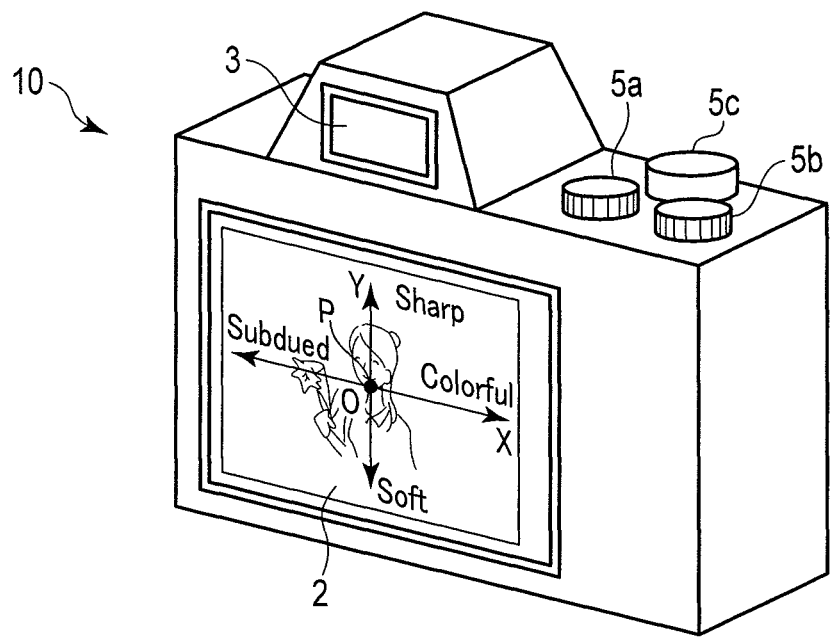
FIG. 6 is a perspective view showing a display example of an imagination map.

As shown in FIG. 6, the imagination map includes an x-axis and a y-axis. One of the two sensitivity word pairs decided in step S106 is associated with one of the two axes. The other of the two sensitivity word pairs decided in step S106 is associated with the other of the two axes. That is, the imagination map defines orthogonal coordinates including an x-axis and a y-axis and indicates a shot image.

In the example of FIG. 6, the sensitivity word pair "colorful" and "subdued" is associated with the x-axis. The sensitivity word pair "sharp" and "soft" is associated with the y-axis. The shooting parameters are adjusted such that the more rightward the user selects a point concerning the x-coordinate of the imagination map, the more "colorful" the image is, and the more leftward the user selects a point, the more "subdued" the image is. Similarly, the shooting parameters are adjusted such that the more upward the user selects a point concerning the y-coordinate of the imagination map, the "sharper" the image is, and the more downward the user selects a point, the "softer" the image is.

Figure 7:
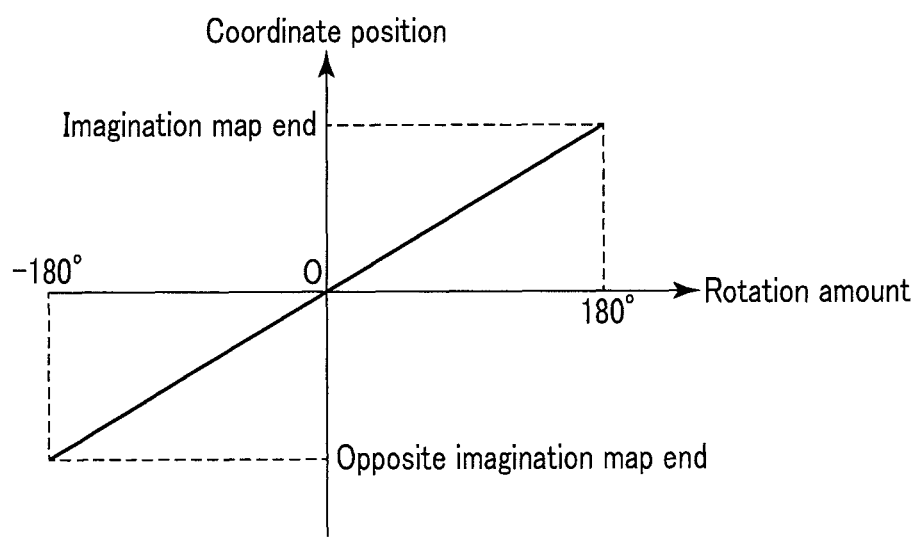
FIG. 7 is a view showing an example of the relationship between the rotation amount of a first rotation operation unit or second rotation operation unit and the coordinate position on the imagination map.

As a means for causing the user to select one point on the coordinates, the first rotation operation unit 5a and the second rotation operation unit 5b are used. The first rotation operation unit 5a and the second rotation operation unit 5b rotate, for example, 360°. As shown in FIG. 7, the first rotation operation unit 5a and the second rotation operation unit 5b are set to move coordinates P from an origin O to an imagination map end by rotating 180°.

Note that the coordinate system displayed as an imagination map is not limited to the orthogonal coordinate system formed from an x-coordinate and a y-coordinate. The coordinate system displayed as an imagination map may be a coordinate system represented by, for example, a distance r from the origin O and a rotation angle θ from the initial line passing through the origin O, that is, a polar coordinate system. The coordinate system displayed as an imagination map may be another coordinate system formed from two axes, for example, an oblique coordinate system. The imagination map is not limited to the two-dimensional coordinate system and may be a three-dimensional coordinate system. In this case as well, an orthogonal coordinate system represented by (x, y, z) may be used, or a spherical coordinate system represented by (r, θ, φ) may be used.

Upon determining in step S107 that displaying an imagination map is not requested, the process advances to step S123. Upon determining that displaying an imagination map is requested, the process advances to step S108.

In step S108, the control unit 6 causes the display unit 2 to display an imagination map. The imagination map may be displayed together with the live image. Alternatively, the live image may be erased to display only the imagination map. When the imagination map is displayed together with the live image, the live image and the imagination map may be displayed in a superimposed manner or separately in different frames.

In step S109, the control unit 6 plots the set coordinates P on the imagination map, as shown in FIG. 6. The initial position of the set coordinates P is, for example, the origin O of the orthogonal coordinates of the imagination map.

In step S110, the control unit 6 determines whether the first rotation operation unit 5a is rotated. Upon determining that the first rotation operation unit 5a is not rotated, the process advances to step S121. Upon determining that the first rotation operation unit 5a is rotated, the process advances to step S111.

In step S111, the control unit 6 changes the x-coordinate of the set coordinates P on the orthogonal coordinates of the imagination map in accordance with the rotational direction and the rotation amount of the first rotation operation unit 5a, and displays the set coordinates P according to the new setting on the imagination map. The control unit 6 decides the new x-coordinate as a selected value selected by the user based on the sensitivity words.

In step S112, the control unit 6 changes the values of the shooting parameters to values associated with the selected value decided in step S111. That is, when the user selects the degree of a sensitivity word, for example, "colorful" or "subdued" as coordinates on the imagination map, magnitudes of shooting parameters corresponding to the selected coordinates are set.

Figure 8:
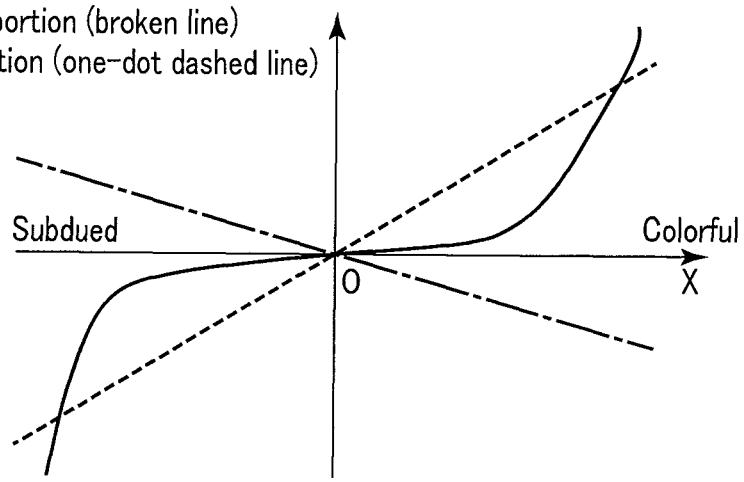
FIG. 8 is a view for explaining an example of a change in the value of a shooting parameter according to the x-coordinate of set coordinates.

An example of changes in the magnitudes of shooting parameters according to the x-coordinate of the set coordinates P will be described here with reference to FIG. 8. The abscissa of FIG. 8 represents the x-coordinate value and corresponds to colorfulness and subduedness. The ordinate of FIG. 8 represents the values of shooting parameters. The solid line indicates the relationship between the degree of color enhancement and the x-coordinate of the point P. The relationship is set such that the larger the x-coordinate is, that is, the more the user requests colorfulness, the higher the degree of color enhancement performed for the image is, and the smaller the x-coordinate is, that is, the more the user requests subduedness, the lower the degree of color enhancement performed for the image is. Note that the relationship between the x-coordinate and the degree of color enhancement is set to a nonlinear relationship.

The broken line and the one-dot dashed line indicate the relationship between the exposure correction value and the x-coordinate of the point P. In this embodiment, high dynamic range (HDR) shooting technology is used for exposure correction. HDR is a technology of compositing a plurality of images shot under different exposure conditions and creating an image of appropriate exposure as a whole. When the images shot under different exposure conditions are composited, a wider dynamic range than that of the image capturing apparatus is implemented. Referring to FIG. 8, the one-dot dashed line indicates an exposure correction value using HDR for a portion where exposure is saturated in the image if HDR is not used. On the other hand, the broken line indicates an exposure correction value using HDR for a portion where exposure is not saturated in the image even if HDR is not used.

According to the example shown in FIG. 8, in the portion where exposure is not saturated, the larger the x-coordinate is, that is, the more the user requests colorfulness, exposure is corrected to the positive side, and the smaller the x-coordinate is, that is, the more the user requests subduedness, exposure is corrected to the negative side. In the portion where exposure is saturated, the larger the x-coordinate is, that is, the more the user requests colorfulness, exposure is corrected to the negative side, and the smaller the x-coordinate is, that is, the more the user requests subduedness, exposure is corrected to the positive side. Even at the same x-coordinate, the exposure correction value for the portion where exposure is not saturated is larger than the exposure correction value for the portion where exposure is saturated. As described above, appropriately selecting the sensitivity word pairs is decisive to merchandise or a service acceptable by the user without any sense of discomfort. Each sensitivity word pair has a quantitative imagination representing what kind of effect is obtained by what kind of control performed because of the opposite imaginations. If the sensitivity words are not in contrast, the following effect is not obtained. The sensitivity words in contrast are associated with technically quantitative control of increasing or decreasing the correction value. That is, the sensitivity words are paired to weaken the abstract imagination common to the sensitivity words and clarify opposite concepts in contrast. An operation amount is associated with the relationship of the distance to a certain one of the sensitivity words. However, this need not be simple quantitative control of a parameter. Even when the control is accelerated, or the effect is enhanced, there is no sense of discomfort for a parameter indicated by a sensitivity word pair. For example, as the exposure correction value or the like is often controlled by a predetermined amount, control tends to be done using a scale. However, a sensitivity word pair produces contrastive sensations. For this reason, a scale or control using predetermined amounts is not always necessary, and the user operations and the device design can be free of constraints. Parameters obtained from the sensitivity word pair can be changed simultaneously or selectively, or continuously or discontinuously, resulting in that the combined effect is enhanced. Hence, even a beginner need not learn an operation concerning one parameter, and parameters set to be effective are freely switched on the device side in accordance with specific program control. The apparatus using sensitivity word pairs to be described in this embodiment does not use the parameters one by one, and instead simultaneously switches many parameters or at least one parameter. One parameter may suffice, as a matter of course.

An example in which exposure correction is performed using HDR has been described above. However, the present invention is not limited to this. For example, the apparatus may be configured to determine whether a portion where exposure is saturated exists in an image, and change the exposure correction between a case where exposure is saturated and a case where exposure is not saturated. The apparatus may be configured to obtain an exposure adjustment effect in each portion by image processing performed on a pixel basis without using HDR.

Referring back to FIG. 4A, after the shooting parameters according to the selected value are set in step S112, the process advances to step S113. In step S113, the control unit 6 determines whether the second rotation operation unit 5b is rotated. Upon determining that the second rotation operation unit 5b is not rotated, the process advances to step S121. Upon determining that the second rotation operation unit 5b is rotated, the process advances to step S114.

In step S114, the control unit 6 changes the y-coordinate of the set coordinates P on the orthogonal coordinates of the imagination map in accordance with the rotational direction and the rotation amount of the second rotation operation unit 5b, and displays the set coordinates P according to the new setting on the imagination map. The control unit 6 decides the new y-coordinate as a selected value selected by the user based on the sensitivity words.

In step S115, the control unit 6 changes the values of the shooting parameters to values associated with the selected value decided in step S114.

Figure 9:
FIG. 9 is a view for explaining an example of a change in the value of a shooting parameter according to the y-coordinate of set coordinates.

An example of changes in the magnitudes of shooting parameters according to the y-coordinate of the set coordinates P will be described here with reference to FIG. 9. The abscissa of FIG. 9 represents the y-coordinate value and corresponds to sharpness and softness. The ordinate of FIG. 9 represents the values of shooting parameters. The solid line indicates the relationship between the stop diameter and the y-coordinate of the point P. The broken line indicates the relationship between contrast and the y-coordinate of the point P. In the example shown in FIG. 9, the larger the y-coordinate is, that is, the more the user requests sharpness, the smaller the stop diameter (the larger the f-number) is adjusted, and the smaller the y-coordinate is, that is, the more the user requests softness, the larger the stop diameter (the smaller the f-number) is adjusted. In addition, the larger the y-coordinate is, that is, the more the user requests sharpness, the higher the contrast is set, and the smaller the y-coordinate is, that is, the more the user requests softness, the lower the contrast is set.

Referring back to FIG. 4B, after the shooting parameters according to the selected value are set in step S115, the process advances to step S116. In step S116, the control unit 6 determines whether the touch panel 2a provided on the display unit 2 displaying the imagination map has detected a touch. Upon determining that the touch panel 2a on the imagination map has not detected a touch, the process advances to step S121. Upon determining that the touch panel 2a on the imagination map has detected a touch, the process advances to step S117.

In step S117, the control unit 6 sets the x-coordinate of the set coordinates P on the orthogonal coordinates of the imagination map in accordance with the touched position. The control unit 6 decides the new x-coordinate as a selected value selected by the user based on the sensitivity words.

In step S118, the control unit 6 sets the y-coordinate of the set coordinates P on the orthogonal coordinates of the imagination map in accordance with the touched position. The control unit 6 decides the new y-coordinate as a selected value selected by the user based on the sensitivity words. The control unit 6 displays the set coordinates P according to the settings of the new x- and y-coordinates on the imagination map.

A strict instruction using a conventional user interface, e.g., a dial, scales or the like, and an intuitive position designation of the touch operation are incompatible and in poor balance in terms of accuracy or resolution, and a sense of discomfort still remains. An interface using a sensitivity word pair, which allows the user to do an operation in the same way as "rather", is considered to readily match the sensation of the touch operation.

In step S119, the control unit 6 changes the values of the shooting parameters to values associated with the selected value decided based on the x-coordinate in step S117, as in step S112.

In step S120, the control unit 6 changes the values of the shooting parameters to values associated with the selected value decided based on the y-coordinate in step S118, as in step S115.

In step S121, the control unit 6 determines whether to end shooting parameter setting by the imagination map. For example, when the user has input an instruction to end the shooting parameter setting by the imagination map, the shooting parameter setting ends. Upon determining not to end the shooting parameter setting by the imagination map, the process returns to step S110. Upon determining to end the shooting parameter setting by the imagination map, the process advances to step S122.

In step S122, the control unit 6 turns off display of the imagination map on the display unit 2 and displays only the live image on the display unit 2. This live image is the live image of the image acquired based on the shooting parameters adjusted in step S112, S115, S119, or S120.

Note that when both the imagination map and the live image are displayed on the display unit 2 in steps S108 to S121, the live image may be an image acquired based on the shooting parameters according to the set coordinates P on the imagination map at that time. That is, the preview may be displayed by reflecting a change in the shooting parameters each time.

In step S123, the control unit 6 determines whether the release button 5*c* is pressed, that is, shooting execution is instructed using the release button 5*c*. Upon determining that shooting execution is not instructed, the process advances to step S126. Upon determining that shooting execution is instructed, the process advances to step S124.

In step S124, the control unit 6 causes the image capturing unit 1 and the like to perform a shooting operation. That is, the control unit 6 causes the image capturing unit 1 to create image data based on the object image, performs necessary image processing for the obtained image data, and acquires image data as captured image data.

In step S125, the control unit 6 records the image data acquired by shooting in the recording unit 4. After that, the process advances to step S126.

In step S126, the control unit 6 determines whether to end camera control. Upon determining not to end camera control, the process returns to step S101. Upon determining to end camera control, camera control ends. For example, when the power button is pressed, camera control ends.

Upon determining in step S102 that the eye sensor 3*a* is detecting the line of sight, the process advances to step S131.

In step S131, the control unit 6 starts image capturing to create a live image.

In step S132, the control unit 6 creates a live image based on image data obtained by image capturing and causes the EVF 3 to display the live image.

In step S133, the scene determination unit 6*a* of the control unit 6 determines the shooting scene based on the image data obtained by image capturing.

In step S134, the control unit 6 decides two sensitivity word pairs according to the shooting scene decided by the scene determination unit 6*a*. Assume that the scene determination unit 6*a* decides the sensitivity word pair "colorful" and "subdued" and the sensitivity word pair "sharp" and "soft" even in step S134.

In step S135, the control unit 6 determines whether it is requested to display an imagination map on the EVF 3. Upon determining that it is not requested to display an imagination map, the process advances to step S123. Upon determining that it is requested to display an imagination map, the process advances to step S136.

In step S136, the control unit 6 causes the EVF 3 to display an imagination map.

In step S137, the control unit 6 plots the set coordinates P at the origin O of orthogonal coordinates which is the initial position on the imagination map.

In step S138, the control unit 6 determines whether the first rotation operation unit 5*a* is rotated. Upon determining that the first rotation operation unit 5*a* is not rotated, the process advances to step S144. Upon determining that the first rotation operation unit 5*a* is rotated, the process advances to step S139.

In step S139, the control unit 6 changes the x-coordinate of the set coordinates P on the orthogonal coordinates of the imagination map in accordance with the rotational direction and the rotation amount of the first rotation operation unit 5*a*, and displays the set coordinates P according to the new setting on the imagination map. The control unit 6 decides the new x-coordinate as a selected value selected by the user based on the sensitivity words.

In step S140, the control unit 6 changes the values of the shooting parameters to values associated with the selected value decided in step S139.

In step S141, the control unit 6 determines whether the second rotation operation unit. 5*b* is rotated. Upon determining that the second rotation operation unit 5*b* is not rotated, the process advances to step S144. Upon determining that the second rotation operation unit 5*b* is rotated, the process advances to step S142.

In step S142, the control unit 6 changes the y-coordinate of the set coordinates P on the orthogonal coordinates of the imagination map in accordance with the rotational direction and the rotation amount of the second rotation operation unit 5*b*, and displays the set coordinates P according to the new setting on the imagination map. The control unit 6 decides the new y-coordinate as a selected value selected by the user based on the sensitivity words.

In step S143, the control unit 6 changes the values of the shooting parameters to values associated with the selected value decided in step S142.

In step S144, the control unit 6 determines whether to end shooting parameter setting by the imagination map. For example, when the user has input an instruction to end the shooting parameter setting by the imagination map, the shooting parameter setting ends. Upon determining not to end the shooting parameter setting by the imagination map on the EVF 3, the process returns to step S138. Upon determining to end the shooting parameter setting by the imagination map, the process advances to step S145.

In step S145, the control unit 6 turns off display of the imagination map on the EVF 3 and displays only the live image on the EVF 3. This live image is the live image of the image acquired based on the shooting parameters adjusted in step S140 and S143. The process then advances to step S123.

Upon determining in step S101 that the shooting mode is not selected, the process advances to step S151.

In step S151, the control unit 6 determines whether the reproduction mode is selected. Upon determining that the reproduction mode is not selected, the process returns to step S101. Upon determining that the reproduction mode is selected, the process advances to step S152.

In step S152, the control unit 6 reads out an image file from the recording unit 4, and reproduces image data stored in the image file.

In step S153, the control unit 6 determines whether reproducing image data different from the image data under reproduction is instructed. Upon determining that reproducing image data different from the image data under reproduction is not instructed, the process returns to step S101. Upon determining that reproducing image data different from the image data under reproduction is instructed, the process advances to step S154.

In step S154, the control unit 6 reads out an image file different from the image file of the image data under reproduction, and reproduces image data stored in the image file. The process then returns to step S101.

Regarding sensitivity words (impression words) as expressions used daily by the user, when a pair of opposite sensitivity words is defined as a sensitivity word pair, in this embodiment, the image capturing apparatus 10 selects two sensitivity word pairs in accordance with the shooting scene. The image capturing apparatus 10 displays an imagination map that associates the two sensitivity word pairs with the two axes of the orthogonal coordinate system, and causes the user to select the degree of sensitivity word pairs displayed on the orthogonal coordinate system. The image capturing apparatus 10 sets shooting parameters in accordance with the selected degree of sensitivity word pairs. The image capturing apparatus 10 can thus provide a mechanism that allows the user to intuitively and informally do complex shooting parameter setting.

Note that in this embodiment, an example has been described in which two shooting parameters are associated with the x-axis of the imagination map, and two other shooting parameters are associated with the y-axis. However, the present invention is not limited to this, and associating at least one shooting parameter with each coordinate axis may suffice. That is, a sensitivity word pair expresses at least one shooting parameter. If the number of shooting parameters corresponding to one coordinate axis increases to two, three, . . . , more parameters are changed at once in accordance with the coordinates selected on the imagination map. Hence, a more complex image expression is attained.

In this embodiment, the shooting parameters corresponding to the x-axis and those corresponding to the y-axis are independent. That is, one shooting parameter is decided based on one of the x- and y-coordinate values. However, the present invention is not limited to this. One shooting parameter may be decided based on both the x- and y-coordinate values. When one shooting parameter is decided by combining sensitivity words, the sensation of the user and the selected shooting parameter can be more appropriate.

In this embodiment, scene determination is done based on the captured image. However, the present invention is not limited to this, and the scene determination may be done by causing the user to select a shooting scene using, for example, a scene dial.

In this embodiment, the sensitivity word pair used on the imagination map is selected in accordance with the shooting scene. However, the present invention is not limited to this, and the user may select the sensitivity word pair. When the user selects the sensitivity word pair, the degree of freedom of operation for the user increases.

Modification of First Embodiment

The image capturing apparatus 10 according to a modification of the first embodiment will be described next with reference to FIGS. 10 and 11. Note that only the difference between the configuration of the image capturing apparatus 10 according to this modification and the arrangement of the image capturing apparatus 10 according to the first embodiment will be explained, and a description of the same arrangement will be omitted.

In this modification, the third rotation operation unit 24 provided on the lens, as shown in FIG. 10, is used in place of the first rotation operation unit 5a according to the first embodiment. Additionally, in this modification, a fourth rotation operation unit 5d provided on the rear surface of the image capturing apparatus 10, as shown in FIG. 11, is used in place of the second rotation operation unit 5b according to the first embodiment. The image capturing apparatus 10 according to the modification does not include the first rotation operation unit 5a and the second rotation operation unit 5b.

In this modification, one of the x- and y-coordinates of the set coordinates P on the orthogonal coordinates of the imagination map is set by rotating the third rotation operation unit 24, and the other of the x- and y-coordinates is set by the fourth rotation operation unit. 5d.

When the user holds the image capturing apparatus 10 according to the modification, the fourth rotation operation unit 5d and the release button 5c are located at positions easy to operate by, for example, the user's right hand. In addition, the third rotation operation unit 24 is located at a position easy to operate by the user's left hand. When the third rotation operation unit 24 and the fourth rotation operation unit 5d are arranged in this way, the user can easily select coordinates on the imagination map by both hands.

Second Embodiment

An image capturing apparatus and a portable terminal according to the second embodiment of the present invention will be described next with reference to FIGS. 12, 13, 14A, 14B, 15, 16, and 17. Note that a description of the same arrangement and operation as the image capturing apparatus 10 according to the first embodiment will be omitted.

FIG. 12 shows the schematic configuration of an image capturing system 100 according to this embodiment. As shown in FIG. 12, the image capturing system 100 includes a portable terminal 40, for example, a smartphone, and a lens-type image capturing apparatus 50. The image capturing apparatus 50 is provided with a mechanism for image capturing such as a lens and an image sensor, but does not include a display unit, a release button, and the like provided in a general camera. An image capturing operation and confirmation of an image acquired by the image capturing apparatus 50 are done by the portable terminal 40 that is, for example, a smartphone.

The image capturing apparatus 50 is attached to the portable terminal 40 via an attachment 60 that physically fixes the image capturing apparatus 50 to the portable terminal 40. The attachment 60 is attached to the portable terminal 40. The attachment 60 is provided with a mounting portion 61. The image capturing apparatus 50 is attached to the mounting portion 61. Data communication between the image capturing apparatus 50 and the portable terminal 40 is done via, for example, wireless LAN. When the portable terminal 40 and the image capturing apparatus 50 are fixed by the attachment 60, the user can operate the image capturing apparatus 50 and the portable terminal 40 as if they were an integrated apparatus.

Figure 13:
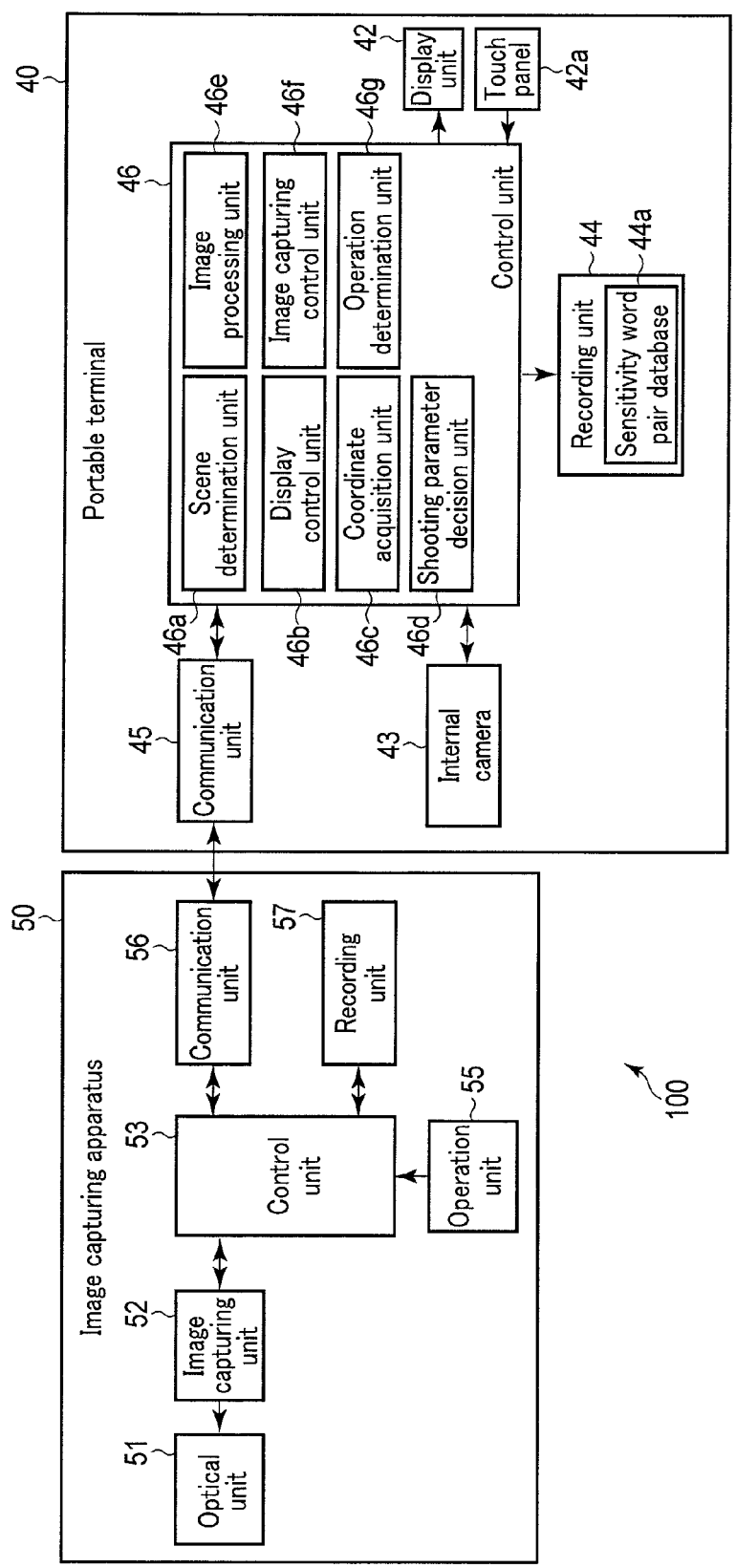
FIG. 13 is a block diagram showing an example of a configuration of the image capturing system including an image capturing apparatus and a portable terminal according to the second embodiment.
Figure 14A:
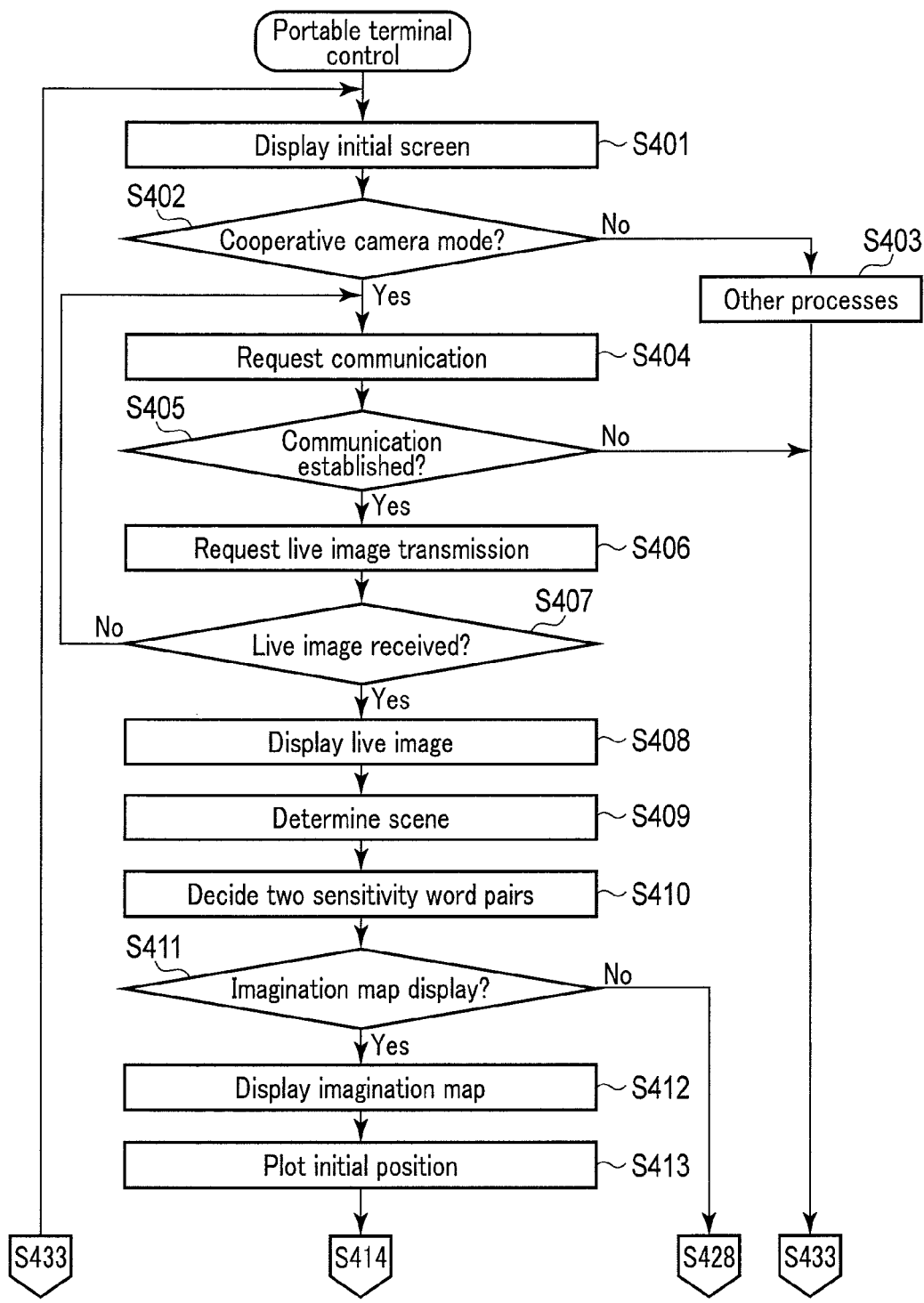
FIG. 14A is a first flowchart showing an operation example of the image capturing system according to the second embodiment.
Figure 14B:
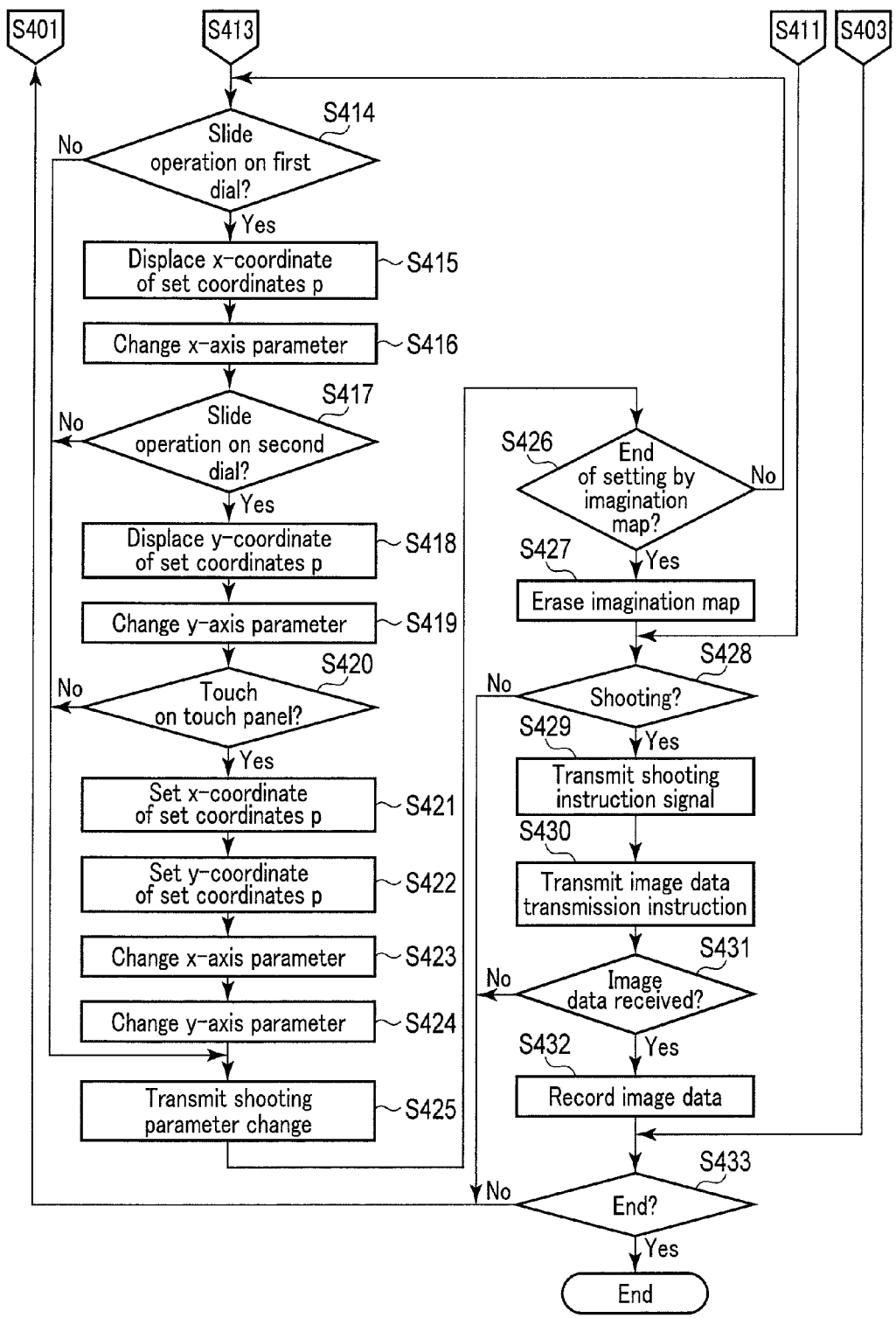
FIG. 14B is a second flowchart showing an operation example of the image capturing system according to the second embodiment.

The configuration of the portable terminal 40 and the image capturing apparatus 50 will be described with reference to FIG. 13.

The image capturing apparatus 50 includes an optical unit 51, an image capturing unit 52, a control unit 53, a recording unit 57, an operation unit 55, and a communication unit 56 that mediates communication with the portable terminal 40. An object image is formed, by the optical unit 51, on the imaging plane of the image sensor included in the image capturing unit 52. The image capturing unit 52 creates image data based on the object image.

The control unit 53 controls the units of the image capturing apparatus 50. The control unit 53 controls, for example, the operation of the lens or stop included in the optical unit 51. The control unit 53 also controls the image capturing operation of the image capturing unit 52. The control unit 53 also performs image processing for the image data created by the image capturing unit 52. The control unit 53 records the processed image data in the recording unit 57. The control unit 53 also controls communication with the portable terminal 40. The control unit 53 transmits the image data to the portable terminal 40 in response to a request from the portable terminal 40.

The operation unit 55 includes a power switch, and the like. The operation unit 55 is a portion that acquires a user instruction. The operation unit 55 transmits the acquired user instruction to the control unit 53.

The portable terminal 40 includes a display unit 42, a touch panel 42a, a recording unit 44, a control unit 46, a communication unit 45 that mediates communication with the image capturing apparatus 50, and an internal camera 43.

The display unit 42 displays an image. The touch panel 42a is provided on the display unit 42 and detects a touched position. The internal camera 43 shoots an object and generates image data. Scene determination may be performed for the image data acquired from the internal camera 43. The recording unit 44 includes a sensitivity word pair DB 44a and records the image data.

The control unit 46 includes a scene determination unit 46a, a display control unit 46b, a coordinate acquisition unit 46c, a shooting parameter decision unit 46d, an image processing unit 46e, an image capturing control unit 46f, and an operation determination unit 46g.

The scene determination unit 46a determines a shooting scene based on image data acquired by, for example, image capturing, and also selects two sensitivity word pairs corresponding to the shooting scene from the sensitivity word pair DB 44a.

The display control unit 46b creates an image based on the image data, and causes the display unit 42 to display the image. The display control unit 46b also causes the display unit 42 to display an imagination map.

The coordinate acquisition unit 46c acquires coordinates selected on a coordinate system displayed on the display unit 42, and decides the values of at least two variables associated with the coordinates as selected values.

The shooting parameter decision unit 46d decides the value of at least one shooting parameter based on the selected values.

The image processing unit 46e performs various kinds of image processing. The image processing includes image processing according to shooting parameters.

The image capturing control unit 46f performs various kinds of control concerning image capturing. The control includes control according to shooting parameters.

The operation determination unit 46g controls an operation according to an instruction detected from the touch panel 42a and the operation unit 55.

The operations of the image capturing apparatus 50 and the portable terminal 40 will be described below with reference to FIGS. 14A, 14B, 15, 16, and 17. The operation of the portable terminal 40 will be explained first with reference to FIGS. 14A and 14B. After, for example, powered on, the portable terminal 40 starts portable terminal control.

In step S401, the control unit 46 causes the display unit 42 to display an initial screen. FIG. 15 shows an example of the initial screen. In the initial screen display, an icon 42b, a cooperative camera mode start button 42c, an album creation button 42d, and an album registration button 42e are displayed on the display unit 42. The icon 42b includes various icons associated with the functions of the portable terminal 40. The cooperative camera mode start button 42c is a region to be selected by the user to start the cooperative camera mode. When a folder storing a plurality of image data will be referred to as an album, the album creation button 42d is an icon configured to create an album folder in the recording unit 44. The album registration button 42e is a button configured to record, in the folder created by the album creation button 42d, the image data recorded in the recording unit 44.

In step S402, the control unit 46 determines whether the cooperative camera mode is selected by touching the cooperative camera mode start button 42c. The cooperative camera mode is a mode to cause the portable terminal 40 to communicate with the image capturing apparatus 50 and make use of the camera function of the image capturing system 100. Upon determining that the cooperative camera mode is not selected, the process advances to step S403. In step S403, the control unit 46 performs an operation other than the cooperative camera mode of this embodiment, for example, speech communication or operations of various kinds of software. A description of the processes will be omitted here. After step S403, the process advances to step S433.

Upon determining in step S402 that the cooperative camera mode is selected, the process advances to step S404. In step S404, the control unit 46 requests communication from the portable terminal 40 to the image capturing apparatus 50. When the image capturing apparatus 50 responds to the request, communication between the portable terminal 40 and the image capturing apparatus 50 starts.

In step S405, the control unit 46 determines whether the communication between the portable terminal 40 and the image capturing apparatus 50 is established. Upon determining that the communication between the portable terminal 40 and the image capturing apparatus 50 is not established, the user is notified that the communication with the image capturing apparatus 50 is impossible by, for example, displaying, on the display unit 42, a message representing that the establishment of communication has failed, and the process advances to step S433. Upon determining that the communication between the portable terminal 40 and the image capturing apparatus 50 is established, the process advances to step S406.

In step S406, the control unit 46 requests the image capturing apparatus 50 to transmit live image data to the portable terminal 40. In response to the request, the image capturing apparatus 50 starts image capturing, creates live image data based on the image obtained by image capturing, and transmits the live image data to the portable terminal 40.

In step S407, the control unit 46 determines whether the live image data is received. Upon determining that the live image data is not received, the process returns to step S404. That is, the control unit 46 confirms establishment of communication and requests live image transmission again. Upon determining in step S407 that the live image data is received, the process advances to step S408.

In step S408, the control unit 46 creates a live image based on the live image data and causes the display unit 42 to display the created live image.

In step S409, the scene determination unit 46a of the control unit 46 determines the shooting scene based on the live image.

In step S410, the scene determination unit 46a of the control unit 46 decides two sensitivity word pairs based on the shooting scene decided in step S409. In this embodiment, a description will be made below assuming that a sensitivity word pair "colorful" and "subdued" and a sensitivity word pair "sharp" and "soft" are selected, as in the first embodiment.

In step S411, the control unit 46 determines whether to cause the display unit 42 to display an imagination map including the two sensitivity word pairs selected in step S410. Upon determining not to cause the display unit 42 to display an imagination map, the process advances to step S428. Upon determining to cause the display unit 42 to display an imagination map, the process advances to step S412.

In step S412, the control unit 46 causes the display unit 42 to display an imagination map together with the live image. The display unit 42 displays, for example, an image shown in FIG. 16. The live image is displayed in the region of a camera screen 42j in FIG. 16. The imagination map is displayed in an imagination map screen 42f. The display unit 42 displays a first dial indicator 42g and a second dial indicator 42h (to be described later) which imitate dials, and a shoot icon 42i (to be described later) as well.

In step S413, the control unit 46 plots set coordinates P at an origin O that is the initial position on the imagination map displayed in the imagination map screen 42f of the display unit 42.

In step S414, the control unit 46 determines whether a slide operation on the first dial indicator 42g of the display unit 42 is detected. Upon determining that a slide operation on the first dial indicator 42g of the display unit 42 is not detected, the process advances to step S425. Upon determining that a slide operation on the first dial indicator 42g is detected, the process advances to step S415.

In step S415, the control unit 46 resets the x-coordinate of the set coordinates P on the orthogonal coordinates of the imagination map in accordance with the slide width of the slide operation detected on the first dial indicator 42g, and displays the set coordinates P according to the new setting on the imagination map. As described above, the first dial indicator 42g is an indicator that imitates a physical dial. The photographer can do an operation of rotating the dial by touching the dial and sliding the finger.

In step S416, the control unit 46 decides the values of the shooting parameters to values associated with the x-coordinate of the point P set in step S415. That is, the control unit 46 decides the values of the shooting parameters according to the degree of, for example, a sensitivity word pair "colorful" and "subdued".

In step S417, the control unit 46 determines whether a slide operation on the second dial indicator 42h displayed on the display unit 42 is detected. Upon determining that a slide operation on the second dial indicator 42h is not detected, the process advances to step S425. Upon determining that a slide operation on the second dial indicator 42h is detected, the process advances to step S418.

In step S418, the control unit 46 resets the y-coordinate of the set coordinates P on the orthogonal coordinates of the imagination map in accordance with the slide width of the slide operation detected on the second dial indicator 42h, and displays the set coordinates P according to the new setting on the imagination map.

In step S419, the control unit 46 decides the values of the shooting parameters to values associated with the y-coordinate of the point P set in step S418. That is, the control unit 46 decides the values of the shooting parameters according to the degree of, for example, a sensitivity word pair "sharp" and "soft".

Note that the first dial indicator 42g and the second dial indicator 42h may be other indicators capable of operating the set coordinates P. For example, the first dial indicator 42g and the second dial indicator 42h may be indicators that imitate a 4-way selector.

In step S420, the control unit 46 determines whether a touch is detected on the imagination map screen 42f. Upon determining that a touch is not detected on the imagination map screen 42f, the process advances to step S425. Upon determining that a touch is detected on the imagination map screen 42f, the process advances to step S421.

In step S421, the control unit 46 sets the x-coordinate of the set coordinates P on the orthogonal coordinates of the imagination map in accordance with the touched position on the imagination map screen 42f.

In step S422, the control unit 46 sets the y-coordinate of the set coordinates P on the orthogonal coordinates of the imagination map screen 42f in accordance with the touched position on the imagination map screen 42f. The control unit 46 displays the set coordinates P according to the new settings of the x- and y-coordinates on the imagination map screen 42f.

In step S423, the control unit 46 decides the values of the shooting parameters in the image capturing apparatus 50 to values associated with the x-coordinate of the point P set in step S421, as in step S416.

In step S424, the control unit 46 decides the values of the shooting parameters in the image capturing apparatus 50 to values associated with the y-coordinate of the set coordinates P set in step S422, as in step S419. The process then advances to step S425.

In step S425, the control unit 46 transmits a signal representing the changed shooting parameters calculated in steps S416, S419, S423, and S424 to the image capturing apparatus 50. The image capturing apparatus 50 changes the shooting parameters in accordance with the signal.

In step S426, the control unit 46 determines whether to end shooting parameter setting by the imagination map displayed on the imagination map screen 42f. Upon determining not to end the shooting parameter setting by the imagination map displayed on the imagination map screen 42f, the process returns to step S414. Upon determining to end the shooting parameter setting by the imagination map displayed on the imagination map screen 42f, the process advances to step S427.

In step S427, the control unit 46 turns off display of the imagination map on the imagination map screen 42f of the display unit 42.

In step S428, the control unit 46 determines whether a shooting operation is performed. The shooting operation is performed by, for example, touching the shoot icon 42i of the display unit 42. Upon determining that a shooting operation is not performed, the process returns to step S401. Upon determining that a shooting operation is performed, the process advances to step S429.

In step S429, the control unit 46 transmits a shooting instruction to the image capturing apparatus 50. The image capturing apparatus 50 performs the shooting operation in accordance with the shooting instruction.

In step S430, the control unit 46 transmits, to the image capturing apparatus 50, an instruction to cause the image capturing apparatus 50 to transmit image data shot by it to the portable terminal 40.

In step S431, the control unit 46 determines whether the image data shot by the image capturing apparatus 50 is received. Upon determining that the image data shot by the image capturing apparatus 50 is not received, the process returns to step S401. Upon determining that the image data shot by the image capturing apparatus 50 is received, the process advances to step S432.

In step S432, the control unit 46 records the received image data in the recording unit 44.

In step S433, the control unit 46 determines whether to end portable terminal control. Upon determining not to end portable terminal control, the process returns to step S401. Upon determining to end portable terminal control, the processing ends.

Figure 17:
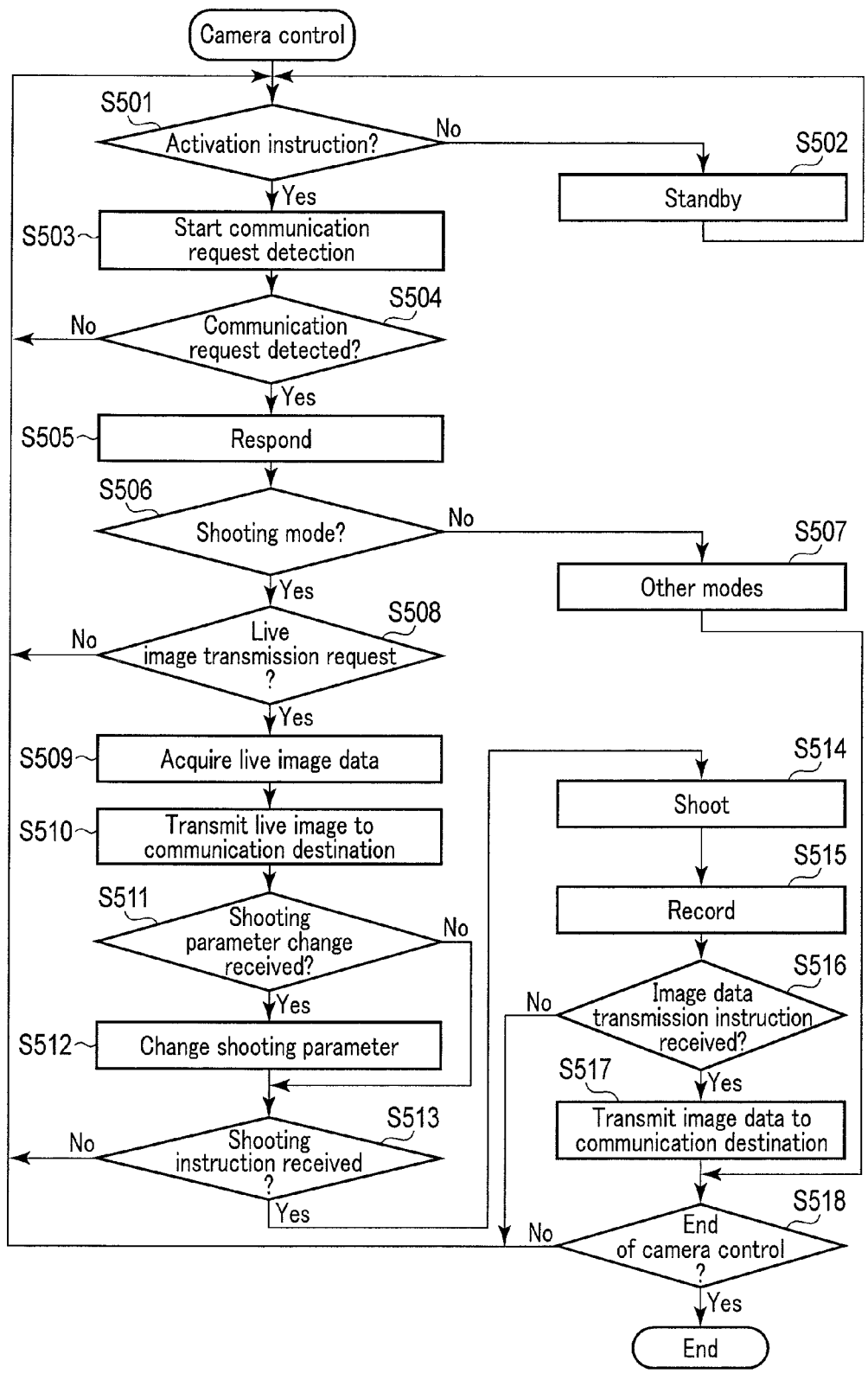
FIG. 17 is a flowchart showing an operation example of the image capturing apparatus according to the second embodiment.

Processing performed by the image capturing apparatus 50 will be described next with reference to the flowchart of FIG. 17. The image capturing apparatus 50 starts camera control when, for example, powered on.

In step S501, the control unit 53 determines whether an activation instruction is input by, for example, pressing an activation button. Upon determining that an activation instruction is not input, the process advances to step S502. In step S502, the control unit 53 sets a standby mode. Then, process returns to step S501.

Upon determining in step S501 that an activation instruction is input, the process advances to step S503.

In step S503, the control unit 53 starts detecting a communication request from the portable terminal 40.

In step S504, the control unit 53 determines whether a communication request from the portable terminal 40 is detected. Upon determining that a communication request from the portable terminal 40 is not detected, the process returns to step S501. Upon determining that a communication request from the portable terminal 40 is detected, the process advances to step S505.

In step S505, the control unit 53 responds to the communication request from the portable terminal 40. With this response, communication between the portable terminal 40 and the image capturing apparatus 50 starts, and control of the image capturing apparatus 50 by the portable terminal 40 starts.

In step S506, the control unit 53 determines whether the shooting mode is selected. Upon determining that the shooting mode is not selected, the process advances to step S507.

In step S507, the control unit 53 executes processing of a mode other than the shooting mode in the image capturing apparatus 50, for example, the reproduction mode in the image capturing apparatus 50. A description of the mode other than the shooting mode will be omitted here. After step S507, the process advances to step S518.

Upon determining in step S506 that the shooting mode is selected, the process advances to step S508. In step S508, the control unit 53 determines whether a request to transmit live image data is received from the portable terminal 40. Upon determining that a request to transmit live image data is not received from the portable terminal 40, the process returns to step S501. Upon determining that a request to transmit live image data is received from the portable terminal 40, the process advances to step S509.

In step S509, the control unit 53 starts image capturing and acquires live image data in response to the request from the portable terminal 40.

In step S510, the control unit 53 transmits the live image data acquired in step S509 to the portable terminal 40.

In step S511, the control unit 53 determines whether the signal of the changed values of the shooting parameters is received from the portable terminal 40. Upon determining that the signal of the changed values of the shooting parameters is not received from the portable terminal 40, the process advances to step S513. Upon determining that the signal of the changed values of the shooting parameters is received from the portable terminal 40, the process advances to step S512.

In step S512, the control unit 53 changes the shooting parameters based on the signal of the changed values of the shooting parameters received from the portable terminal 40. That is, the shooting parameters of the image capturing apparatus 50 are set in accordance with changes in the set coordinates P changed by the user on the imagination map displayed on the imagination map screen 42f of the display unit 42 of the portable terminal 40. After the shooting parameters of the image capturing apparatus 50 are set, the process advances to step S513.

In step S513, the control unit 53 determines whether a shooting instruction is received from the portable terminal 40. Upon determining that a shooting instruction is not received from the portable terminal 40, the process returns to step S501. Upon determining that a shooting instruction is received from the portable terminal 40, the process advances to step S514.

In step S514, the control unit 53 performs the shooting operation in accordance with the shooting instruction received from the portable terminal 40.

In step S515, the control unit 53 records the image data acquired by shooting in the recording unit 57.

In step S516, the control unit 53 determines whether an instruction to transmit the image data in step S515 to the portable terminal 40 is received from the portable terminal 40. Upon determining that an instruction to transmit the image data in step S515 to the portable terminal 40 is not received from the portable terminal 40, the process returns to step S501. Upon determining that an instruction to transmit the image data in step S515 to the portable terminal 40 is received from the portable terminal 40, the process advances to step S517.

In step S517, the control unit 53 transmits the image data recorded in step S515 to the portable terminal 40 in accordance with the transmission instruction received from the portable terminal 40.

In step S518, the control unit 53 determines whether to end camera control. Upon determining not to end camera control, the process returns to step S501. Upon determining to end camera control, the processing ends.

According to this embodiment, the portable terminal 40 and the image capturing apparatus 50 cooperate by communication, thereby functioning as the image capturing system 100 as a whole. In this embodiment as well, the same effects as in the first embodiment can be obtained. That is, the image capturing system 100 can provide a mechanism that allows the user to intuitively and informally do complex shooting parameter setting.

Note that the processes of the image capturing apparatus according to the above-described embodiment can be implemented using programs. The programs can be stored in various kinds of media. The programs can be stored in storage media of external storage devices such as a memory card (ROM card or RAM card), a magnetic disk (floppy disk or hard disk), an optical disk (CD-ROM or DVD), and a semiconductor memory. The image capturing apparatus 10 or 50 or the portable terminal 40 loads the programs from the media and performs processing. The programs may be provided to the image capturing apparatus 10 or 50 or the portable terminal 40 via the Internet or the like.

The present invention has been described by exemplifying parameter control of the image capturing apparatus. However, the present invention is applicable to any device operated by a human having sensitivity. The present invention is effective for a device that uses contrasting sensitivity words so that the imagination of one sensitivity word is made clear by the counterpart sensitivity word. For example, the present invention is applicable to industrial and medical observation apparatuses and inspection apparatuses in the field of imaging or the like. The present invention is also applicable to a device manipulated by a human for on-board use or the like, as a matter of course. The above-described contents can be expressed as supplementary notes below.

[Supplementary Note 1]

There is provided a device control apparatus comprising:

a display unit configured to, when a pair of sensitivity words that are words arousing a control imagination and arousing control processes opposite to each other are selected as a sensitivity word pair, display a coordinate system in which at least two variables represent a degree of the sensitivity words which are included in different sensitivity word pairs together with the sensitivity words corresponding to the variables;

a coordinate acquisition unit configured to acquire coordinates selected on the coordinate system and decide values of the at least two variables as selected values;

a control parameter decision unit configured to decide a value of at least one control parameter based on the selected values; and a control unit configured to control a device in accordance with the control parameter.

[Supplementary Note 2]

There is provided a device control apparatus comprising:

a database configured to cause a pair of sensitivity words that are words arousing a control imagination to match a direction of a change in a control parameter;

a display unit configured to display an operation position together with the sensitivity words;

a coordinate acquisition unit configured to acquire coordinates on the display unit and decide a value corresponding to the pair of sensitivity words as a selected value;

a control parameter decision unit configured to decide a value of at least one control parameter from the database based on the selected value; and a control unit configured to control a device in accordance with the control parameter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus comprising:
   an image capturing unit configured to capture an object and acquire image data;
   an image processing unit configured to perform image processing for the image data;
   a database including a relationship between a sensitivity word pair that is a pair of sensitivity words and a change in a control parameter;
   a display unit configured to display an operation position together with the sensitivity word pair;
   a coordinate acquisition unit configured to acquire coordinates on the display unit and decide a value corresponding to the sensitivity word pair as a selected value;
   a shooting parameter decision unit configured to decide a value of at least one shooting parameter from the database based on the selected value; and
   a control unit configured to control an operation of at least one of the image capturing unit and the image processing unit based on the value of the shooting parameter,
   wherein the coordinates are included in a coordinate system representing at least two independent variables, and the at least two independent variables correspond to different sensitivity word pairs and represent a degree of the sensitivity words, and
   wherein the sensitivity word pair includes at least one of "subdued" and "colorful", "soft" and "sharp", "fantastic" and "real", "quiet" and "lively", "romantic" and "classic", and "plain" and "gorgeous".

2. The image capturing apparatus according to claim 1, wherein the display unit simultaneously displays the coordinate system, the sensitivity words, and a live image based on the image data acquired using the shooting parameter decided by the shooting parameter decision unit.

3. The image capturing apparatus according to claim 1, wherein the coordinate system comprises one of an orthogonal coordinate system and a polar coordinate system.

4. The image capturing apparatus according to claim 1, wherein the shooting parameter corresponding to the sensitivity word pair includes one of a stop diameter, a shutter speed, a contrast, an exposure value, a degree of color enhancement, a chroma, a brightness, a sharpness, a degree of blur, noise, and shading.

5. The image capturing apparatus according to claim 1, wherein the display unit displays the coordinates on the coordinate system.

6. The image capturing apparatus according to claim 1, further comprising a touch panel provided in correspondence with the display unit, and
   the coordinate acquisition unit acquires the coordinates based on a touched position on the touch panel.

7. The image capturing apparatus according to claim 1, further comprising a rotation operation unit configured to acquire a rotation amount, and
   the coordinate acquisition unit acquires the coordinates based on the rotation amount acquired by the rotation operation unit.

8. A control method of an image capturing apparatus, the method comprising:
   capturing an object and acquiring image data;
   performing image processing for the image data;
   causing a display unit to display an operation position together with a sensitivity word pair;
   acquiring coordinates displayed on the display unit and deciding a value corresponding to the sensitivity word pair as selected value;
   deciding, based on the selected value, a value of at least one shooting parameter from a database configured to cause the pair of sensitivity words to match a direction of a change in a control parameter; and
   controlling, based on the value of the shooting parameter, at least one of the capturing the object and acquiring the image data and the performing image processing,
   wherein the coordinates are included in a coordinate system representing at least two independent variables, and the at least two independent variables correspond to different sensitivity word pairs and represent a degree of the sensitivity words, and
   wherein the sensitivity word pair includes at least one of "subdued" and "colorful", "soft" and "sharp", "fantastic" and "real", "quiet" and "lively", "romantic" and "classic", and "plain" and "gorgeous".

9. A non-transitory computer-readable storage medium storing a program which, when executed, performs a method comprising:
   capturing an object and acquiring image data;
   performing image processing for the image data;
   causing a display unit to display an operation position together with a sensitivity word pair;

acquiring coordinates displayed on the display unit and deciding a value corresponding to the sensitivity word pair as selected value;

deciding, based on the selected value, a value of at least one shooting parameter from a database configured to cause the pair of sensitivity words to match a direction of a change in a control parameter; and controlling, based on the value of the shooting parameter, at least one of the capturing the object and acquiring the image data and the performing image processing, wherein the coordinates are included in a coordinate system representing at least two independent variables, and the at least two independent variables correspond to different sensitivity word pairs and represent a degree of the sensitivity words, and wherein the sensitivity word pair includes at least one of "subdued" and "colorful", "soft" and "sharp", "fantastic" and "real", "quiet" and "lively", "romantic" and "classic", and "plain" and "gorgeous".

* * * * *